(12) United States Patent
Mihara et al.

(10) Patent No.: US 8,085,477 B2
(45) Date of Patent: Dec. 27, 2011

(54) IMAGE FORMING OPTICAL SYSTEM AND ELECTRONIC IMAGE PICKUP APPARATUS USING THE SAME

(75) Inventors: Shinichi Mihara, Tama (JP); Kanato Adachi, Kawasaki (JP)

(73) Assignee: Olympus Corporation, Tokyo (JP)

( * ) Notice: Subject to any disclaimer, the term of this patent is extended or adjusted under 35 U.S.C. 154(b) by 61 days.

(21) Appl. No.: 12/653,045

(22) Filed: Dec. 7, 2009

(65) Prior Publication Data
US 2010/0188553 A1 Jul. 29, 2010

(30) Foreign Application Priority Data
Dec. 12, 2008 (JP) ................................. 2008-317227

(51) Int. Cl.
*G02B 15/14* (2006.01)
(52) U.S. Cl. ........................................ 359/682; 359/684
(58) Field of Classification Search ............... 348/240.3; 359/680, 681, 682, 684, 685, 686
See application file for complete search history.

(56) References Cited

U.S. PATENT DOCUMENTS
2007/0229972 A1* 10/2007 Satori ........................... 359/686

FOREIGN PATENT DOCUMENTS
JP 2005-266129 9/2005
JP 2007-156385 6/2007

OTHER PUBLICATIONS
Claim set (Translated) for JP 2008-317227 (Apr. 6, 2011).*

* cited by examiner

*Primary Examiner* — David N Spector
(74) *Attorney, Agent, or Firm* — Kenyon & Kenyon LLP

(57) ABSTRACT

It is preferable that for an image forming optical system a basic structure which includes a first lens group having a negative refracting power, which is made of one cemented lens component, a second lens group having a positive refracting power, a third lens group having a positive refracting power, which is made of one lens component, and is movable for focusing, and a fourth lens group which is made of one lens component having an aspheric surface, and at the time of zooming from a wide angle end to a telephoto end, the second lens group moves only toward the object side, and the first lens group and the third lens group move while following a trajectory of movement different from a trajectory of movement of the second lens group is adopted, and that the image forming optical system satisfies predetermined conditional expressions.

22 Claims, 19 Drawing Sheets

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2008-317227 filed on Dec. 12, 2008; the entire contents of which are incorporated herein by reference.

BACKGROUND OF THE INVENTION

1. Field of the Invention

The present invention relates to an image forming optical system of a slim type, particularly suitable for an electronic image pickup optical system, which has a superior image forming performance, and an electronic image pickup apparatus using the same.

2. Description of the Related Art

A digital camera has reached a level of being used practically, regarding making large the number of pixels (high image quality), and small-sizing and slimming. Also from a function point of view and market point of view, a digital camera has substituted a silver salt 35 mm film camera. Therefore, as a next trend of evolution, further increase in the number of pixels and further slimming have been sought.

As a prior art with a potential for slimming, an optical system described in Japanese Patent Application Laid-open Publication No. 2005-266129 is available. In Japanese Patent Application Laid-open Publication No. 2005-266129, an image forming optical system which includes in order from an object side, a first lens group having a negative refracting power, a second lens group having a positive refracting power, and a third lens group having a positive refracting power has been proposed. Here, the first lens group includes one lens component in which, a positive lens and a negative lens are cemented in this order, and a cemented surface thereof is an aspheric surface. The second lens group includes a positive lens component and a negative lens component in this order. The third lens group includes one lens component. Moreover, in Japanese Patent Application Laid-open Publication No. 2007-156385, an image forming optical system which includes in order from an object side, a first lens group G1 having a negative refracting power, a second lens group G2 having a positive refracting power, a third lens group G3 having a positive refracting power, and a fourth lens group has been disclosed. Here, the first lens group G1 includes one negative lens having a biconcave shape, and the fourth lens group has an aspheric surface. Moreover, in this image forming optical system, zooming and focusing are carried out by changing distances between the lens groups.

SUMMARY OF THE INVENTION

An image forming optical system according to a first aspect of the present invention includes in order from an object side
a first lens group having a negative refracting power, a second lens group having a positive refracting power, a third lens group having a positive refracting power, and a fourth lens group, and
the first lens group includes one cemented lens component, and
the third lens group includes one lens component, and is movable for focusing, and
the fourth lens group includes one lens component having an aspheric surface, and
at the time of focusing from a wide angle end to a telephoto end, the second lens group moves only toward the object side, and
the first lens group and the third lens group move while following a trajectory of movement different from a trajectory of movement of the second lens group.

Moreover, the image forming optical system further satisfies one of the following conditional expressions (1) and (2)

$$-1.5 < fw/f4 < 0.3 \quad (1)$$

$$1.0 < \beta 4w < 2.0 \quad (2)$$

where,
f4 denotes a focal length of the fourth lens group,
fw denotes a focal length of the overall image forming optical system at the wide angle end when focused to a predetermined object point,
$\beta 4w$ denotes a magnification of the fourth lens group at the wide angle end, when focused at a predetermined object point, and
the predetermined object point is the farthest object point which can be focused.

An electronic image pickup apparatus according to a second aspect of the present invention includes
the abovementioned image forming optical system,
an electronic image pickup element, and
an image processing mechanism which processes image data obtained by picking up an image formed through the image forming optical system, by the electronic image pickup element, and outputs as image data in which, a shape of an image is changed, and
the image forming optical system is a zoom lens system, and
the zoom lens system satisfies the following conditional expression (24) when focused on a predetermined object point $$0.7 < y_{07}/(fw \cdot \tan \omega_{07w}) < 0.97 \quad (24)$$

where,
$y_{07}$ is expressed as $y_{07}=0.7 \cdot y_{10}$, when a distance (the maximum image height) from a center up to the farthest point on an effective image pickup surface (on a surface on which an image can be picked up) of the electronic image pickup element is let to be $y_{10}$,
$\omega_{07w}$ is an angle with respect to an optical axis in an object-point direction corresponding to an image point from a center on the image pickup surface up to a position of $y_{07}$, at a wide angle end, and
fw is a focal length of the overall zoom lens system at the wide angle end when focused on a predetermined object point.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at the wide angle end, FIG. 2B shows an intermediate state, and FIG. 2C shows a state at the telephoto end;

FIG. 3A shows a state at the wide angle end, FIG. 3B shows an intermediate state, and FIG. 3C shows a state at the telephoto end;

FIG. 4A shows a state at the wide angle end, FIG. 4B shows an intermediate state, and FIG. 4C shows a state at the telephoto end;

FIG. 5A shows a state at the wide angle end, FIG. 5B shows an intermediate state, and FIG. 5C shows a state at the telephoto end;

FIG. 6A shows a state at the wide angle end, FIG. 6B shows an intermediate state, and FIG. 6C shows a state at the telephoto end;

FIG. 7A shows a state at the wide angle end, FIG. 7B shows an intermediate state, and FIG. 7C shows a state at the telephoto end;

FIG. 8A shows a state at the wide angle end, FIG. 8B shows an intermediate state, and FIG. 8C shows a state at the telephoto end;

FIG. 9A shows a state at the wide angle end, FIG. 9B shows an intermediate state, and FIG. 9C shows a state at the telephoto end;

FIG. 10A shows a state at the wide angle end, FIG. 10B shows an intermediate state, and FIG. 10C shows a state at the telephoto end;

FIG. 11A shows a state at the wide angle end, FIG. 11B shows an intermediate state, and FIG. 11C shows a state at the telephoto end;

FIG. 12A shows a state at the wide angle end, FIG. 12B shows an intermediate state, and FIG. 12C shows a state at the telephoto end;

FIG. 19A is a front view of a mobile telephone 400, FIG. 19B is a side view of the mobile telephone 400, and FIG. 19C is a cross-sectional view of a photographic optical system 405.

DETAILED DESCRIPTION OF THE INVENTION

Figure 1A:
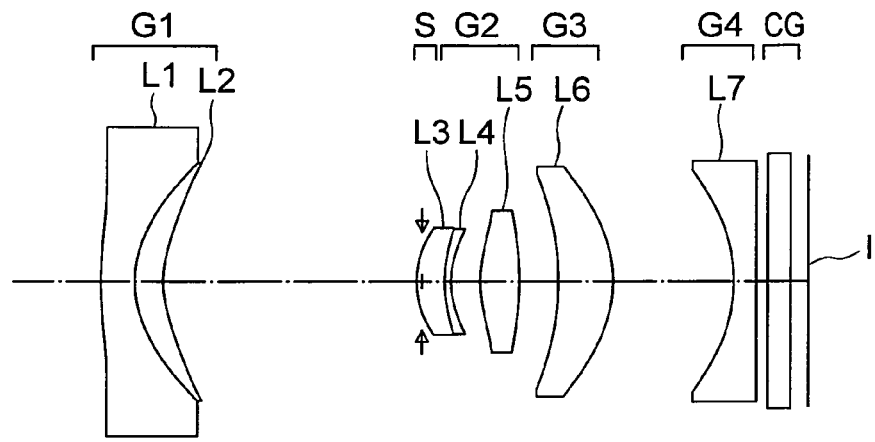
FIG. 1A, FIG. 1B, and FIG. 1C are cross-sectional views along an optical axis showing an optical arrangement at a time of infinite object point focusing of a zoom lens system according to a first embodiment of the present invention, where.

An image forming optical system according to the present invention has adopted an arrangement that includes in order from an object side, a first lens group having a negative refracting power, a second lens group having a positive refracting power, a third lens group having a positive refracting power, and a fourth lens group, and the first lens group includes one cemented lens component, and the third lens group includes one lens component, and is movable for focusing, and the fourth lens group includes one lens component having an aspheric surface, and at the time of zooming from the wide angle end to the telephoto end, the second lens group moves only toward the object side, and the first lens group and the third lens group move while following a trajectory of movement different from a trajectory of movement of the second lens group. Moreover, it is preferable that the image forming optical system according to the present invention further satisfies one of the following conditional expressions (1) and (2)

$$-1.5 < fw/f4 < 0.3 \quad (1)$$

$$1.0 < \beta 4w < 2.0 \quad (2)$$

where, f4 denotes a focal length of the fourth lens group, fw denotes a focal length of the overall image forming optical system at the wide angle end when focused to a predetermined object point, β4w denotes a magnification of the fourth lens group at the wide angle end, when focused at a predetermined object point, and the predetermined object point is the farthest object point which can be focused.

Moreover, an electronic image pickup apparatus of the present invention includes the abovementioned image forming optical system, an electronic image pickup element, and an image processing mechanism which processes image data obtained by picking up an image formed through the image forming optical system, by the electronic image pickup element, and outputs as image data in which, a shape of an image is changed, and the image forming optical system is a zoom lens system, and the zoom lens system satisfies the following conditional expression (24) when focused on a predetermine object point.

$$0.7 < y_{07}/(fw \cdot \tan \omega_{07w}) < 0.97 \quad (24)$$

where, $y_{07}$ is expressed as $y_{07}=0.7 \cdot y_{10}$, when a distance (the maximum image height) from a center up to the farthest point on an effective image pickup surface (on a surface on which an image can be picked up) of the electronic image pickup element is let to be $y_{10}$, $\omega_{07w}$ is an angle with respect to an optical axis in an object-point direction corresponding to an image point from a center on the image pickup surface up to a position of $y_{07}$, at a wide angle end, and fw is a focal length of the overall zoom lens system at the wide angle end when focused on a predetermined object point.

Embodiments in which, the image forming optical system according to the present invention is applied to the zooming optical system will be described below in detail by referring to the accompanying diagrams. However, the present invention is not restricted to the embodiments described below. Before explaining the embodiments, an action and an effect of the image forming optical system of the embodiment will be described below.

The zooming optical system which includes a first lens group having a negative refracting power is called as a negative-lead type zooming optical system. A normal negative-lead type zooming optical system includes a first lens group having a negative refracting power, a second lens group having a positive refracting power, which is involved mainly in zooming, and a third lens group having a positive refracting power which is capable of focusing. Moreover, for correcting an aberration more favorably, there is also an arrangement in which, a fourth lens group is provided on an image side of the third lens group. The image forming optical system (zoom lens system) in the embodiments also corresponds to such arrangement.

The image forming optical system of the embodiment, includes in order from an object side, a first lens group having a negative refracting power, a second lens group having a positive refracting power, a third lens group having a positive refracting power, and a fourth lens group. Here, the first lens group includes one cemented lens component. The third lens group includes one lens component, and is movable for focusing. Moreover, the fourth lens group includes one lens component having an aspheric surface.

At the time of zooming from the wide angle end to the telephoto end, the second lens group moves only toward the object side, the first lens group and the third lens group move while following a trajectory of movement different from a trajectory of movement of the second lens group. Furthermore, the image forming optical system satisfies the following conditional expression (1)

$$-1.5 < fw/f4 < 0.3 \quad (1)$$

where, f4 denotes a focal length of the fourth lens group, fw denotes a focal length of the overall image forming optical system at the wide angle end when focused to a predetermined object point, and the predetermined object point is the farthest object point which can be focused.

When an overall length of the negative-lead type zooming optical system is to be shortened further, distances between conjugate points of a combined system from the second lens group onward are to be made as short as possible. By doing so, the positive refracting power of the second lens group becomes strong. As the positive refracting power of the second lens group becomes strong, there is a remarkable increase in positive Petzval's sum. In a normal negative-lead type zooming optical system, the first lens group is formed of two single lenses in order of a negative lens and a positive lens from the object side. At this time, the negative lens and the positive lens are disposed at a constant distance, and an aberration is corrected by making high a refractive index of the positive lens. However, a point that a material cost and a processing cost are high, a point that an accuracy sought for assembling of the first lens group is high, and a point that it is inept for slimming are issues. Therefore, in the image forming optical system of the embodiments, the first lens group is let be the one cemented lens component as it is, and Petzval's sum is corrected by satisfying conditional expression (1).

When an upper limit value in conditional expression (1) is surpassed, correction of the Petzval's sum becomes difficult. Whereas, when a lower limit value in conditional expression (1) is surpassed, correction of a coma aberration and a pincushion distortion at the telephoto end becomes difficult.

Moreover, it is more preferable that the image forming optical system satisfies the following conditional expression (1') instead of conditional expression (1).

$$-1.5 < fw/f4 < 0.0 \quad (1')$$

It is all the more preferable that the image forming optical system satisfies the following conditional expression (1") instead of conditional expression (1)

$$-1.3 < fw/f4 < -0.1 \quad (1'')$$

It is the most favorable that the image forming optical system satisfies the following conditional expression (1''') instead of conditional expression (1).

$$-1.3 < fw/f4 < -0.45 \quad (1''')$$

When an attempt is made to satisfy conditional expressions (1), (1'), (1"), or (1'''), magnification of the fourth lens group solely tends to be high. In this case, a combined focal length of lens groups from the first lens group up to the third lens group is to be made short. When the combined focal length is made short, correction of various aberrations becomes difficult.

Therefore, the image forming optical system of the embodiments may be let to satisfy the following conditional expression (2)

$$1.0 < \beta 4w < 2.0 \quad (2)$$

where,

β4w denotes a magnification of the fourth lens group at the wide angle end when focused at a predetermined object point, and the predetermined object point is the farthest object point which can be focused.

When an upper limit value in conditional expression (2) is surpassed, correction of the coma aberration, astigmatism, and distortion becomes difficult. Whereas, when a lower limit value in conditional expression (2) is surpassed, correction of Petzval's sum becomes difficult.

For the image forming optical system to satisfy conditional expression (2), it is preferable that the fourth lens group is brought as close as possible to an image plane. A range provided in conditional expression (a) may be considered as a range for bringing the fourth lens group close (range near image plane)

$$0.01 < d4iw/(Dw+Dt) < 0.05 \quad (a)$$

where, d4iw is an air conversion length of an optical axial distance from an apex of a surface nearest to the image side of the fourth lens group up to an image forming surface, at the wide angle end, Dw is a total length of the image forming optical system at the wide angle end, when focused to a predetermined object point, Dt is a total length of the image forming optical system at the telephoto end, when focused to a predetermined object point, and The predetermined object point is the farthest object point which can be focused.

A height of a paraxial light beam being low near the image plane, even when a lens element of somewhat strong power is set, an effect imparted to a focal length and a focal position of the overall system is small. Moreover, when the refracting power of the fourth lens group is let to be somewhat strong negative refracting power from a weak positive refracting power, it is possible to reduce a fluctuation in a position of an exit-pupil due to the zooming. Therefore, reaching from the wide angle end up to the telephoto end, a change in an angle of emergence of principal light rays becomes small.

Generally, when an image pickup element of a small size is used, shading is susceptible to occur. However, in the image forming optical system according to the embodiments, since the change in the angle of emergence of the principal light rays is small while reaching from the wide angle end up to the telephoto end, even when it is a case in which the image pickup element of a small size is used, a synergistic effect that it is possible to prevent the occurrence of shading is achieved. Shading is a phenomenon which occurs when an angle of incidence on an image pickup surface is not appropriate.

Moreover, in the image forming optical system according to the embodiments, as it will be evident from the embodiments which will be described later, a cover glass for the image pickup element is disposed in front (object side) of the image pickup element. However, the fourth lens may be used as a cover glass. Or, a surface nearest to the image side of the fourth lens group may be let to be a flat surface, and a cover glass may be cemented to this flat surface.

Moreover, in a conventional negative-lead type zooming optical system, a residual aberration due to the first lens group and the second lens group has been corrected by providing an aspheric surface in the third lens group, in many cases. Incidentally, when such an arrangement is made, aberration fluctuation due to focusing was susceptible to occur.

Therefore, in the image forming optical system according to the embodiments, an aspheric surface is introduced in the fourth lens group. It is preferable that the aspheric surface is provided particularly to a surface nearest to the object side. When such an arrangement is made, the residual aberration can be corrected in the fourth lens group. Moreover, accordingly, even when the aspheric surface is provided to the third lens group, it is possible to make that aspheric surface to be a surface which corrects an aberration occurring therein (third lens group). Therefore, it is possible to suppress the aberration fluctuation due to focusing, to be small.

The fourth lens group may be let to include a single lens. Such an arrangement is preferable for slimming of the image forming optical system.

Moreover, the image forming optical system according to the embodiments may satisfy the following conditional expressions (3) and (4).

$$1.35 < n4 < 1.65 \quad (3)$$

$$30 < \nu 4 < 100 \quad (4)$$

where, n4 denotes a refractive index for a d-line of a medium which forms the single lens in the fourth lens group, and $\nu$ denotes Abbe's number for the medium which forms the single lens in the fourth lens group.

When an upper limit value in conditional expression (3) is surpassed, the correction of Petzval's sum becomes difficult. Whereas, when a lower limit value in conditional expression (3) is surpassed, the coma aberration, the astigmatism, and the distortion are susceptible to occur. Moreover, when a lower limit value in conditional expression (4) is surpassed, or when an upper limit value in conditional expression (4) is surpassed, the chromatic aberration of magnification is susceptible to become substantial.

Moreover, in the image forming optical system according to the embodiments, the cemented lens component in the first lens group may include a negative lens $L_{1N}$ and a positive lens $L_{1P}$, and the negative lens $L_{1N}$ and the positive lens $L_{1P}$ may be cemented in this order from the object side. When such an arrangement is made, it is possible to realize sliming of the optical system as compared to the normal negative-lead type zooming optical system (negative lens and positive lens are separated). Moreover, a short front focal position of the second lens group serves the purpose. Therefore, it is easy to increase a power of the second lens group, which is effective for shortening of the total length.

Moreover, in the image forming optical system of the present invention, in such case, it is preferable to cement a transparent material having a substantially different dispersion, and to let a cemented surface $S_C$ of the negative lens $L_{1N}$ and the positive lens $L_{1P}$ to be an aspheric surface. When such cemented lens component is used in the first lens group, it is possible to achieve a remarkable effect in correction of a high-order component (distortion of color) related to an image height of the chromatic aberration of magnification and a color coma at the wide angle end. It is preferable to let a difference in refractive indices of media forming the cemented surface $S_C$ to be not more than 0.12. When such an arrangement is made, it is possible to suppress an adverse effect on a Seidel aberration at a reference wavelength.

On the other hand, when the cemented surface $S_C$ is not let to be an aspheric surface, it is preferable to let the difference in the refractive indices of media forming the cemented surface $S_C$ to be not less than 0.2. It is more preferable to let the difference in the refractive indices to be not less than 0.3, and the difference in the refractive indices not less than 0.4 or not less than 0.5 is even more preferable. However, when the difference in the refractive indices is beyond 0.7, securing the power of the first lens group becomes difficult. In this case, the shortening of the overall length is susceptible to be hindered, or the correction of the chromatic aberration becomes difficult.

Moreover, when coordinate axes are let to be such that, an optical axial direction is z, and a direction perpendicular to the optical axis is h, R is let to be a radius of curvature on an optical axis of a spherical surface component, k is let to be a conical constant, and $A_4$, $A_6$, $A_8$, $A_{10}$, . . . are let to be aspherical coefficients, and when a shape of the aspheric surface is expressed by the following expression (5)

$$z = h^2/R/[1+\{1-(1+k)h^2/R^2\}^{1/2}] + A_4 h^4 + A_6 h^6 + A_8 h^8 + A_{10} h^{10} + \ldots \quad (5)$$

then it is preferable that the image forming optical system satisfies the following conditional expression (6)

$$0.05 \leq |z_C(h_C) - z_B(h_B)|/tp \leq 0.96 \quad (6)$$

where, $z_B(h)$ is a shape of a surface $S_B$ in contact with air of the positive lens $L_{1P}$, which is according to expression (5), $z_C(h)$ is a shape of a contact surface $S_C$, which is according to expression (5), tp is an optical axial thickness of the positive lens $L_{1P}$, $h_B=2.5a$, and $h_C=2.5a$, where, a is a quantity according to the following conditional expression (7), $$a=(y_{10})^2 \cdot \log_{10}\gamma/fw \quad (7)$$

and moreover, in expression (7), $y_{10}$ is the maximum image height, $\gamma$ is a zooming ratio when focused at the predetermined object point, and moreover, for letting an apex of each surface to be an origin point, $z(0)=0$ all the time, and the predetermined object point is the farthest object point which can be focused.

A zooming ratio, which is a focal length of the overall system at the telephoto end/a focal length of the overall system at the wide angle end, and the maximum image height, when the electronic image pickup element is disposed near an image forming position of the image forming optical system of the embodiments, is a distance from a center up to the farthest point on an effective image pickup surface (a surface on which an image can be picked up) of this electronic image pickup element.

When a lower limit in conditional expression (6) is surpassed, the correction of the chromatic aberration is susceptible to be insufficient. Whereas, when an upper limit in conditional expression (6) is surpassed, when an attempt is made to process the positive lens $L_{1P}$ to be thin, it is difficult to secure a thickness of a circumferential portion.

Moreover, it is desirable that the image forming optical system satisfies the following conditional expression (6') instead of conditional expression (6).

$$0.15 \leq |z_C(h_C)-z_B(h_B)|/tp \leq 0.93 \quad (6')$$

Furthermore, it is most preferable that the image forming optical system satisfies the following conditional expression (6'') instead of conditional expression (6)

$$0.25 \leq |z_C(h_C)-z_B(h_B)|/tp0.90 \quad (6'')$$

Any one of the surface $S_A$ in contact with air of the negative lens $L_{1N}$, the surface $S_B$ in contact with air of the positive lens $L_{1P}$, and the contact surface $S_C$ may be a spherical surface.

Moreover, when coordinate axes are let to be such that, an optical axial direction is z, and a direction perpendicular to the optical axis is h, R is let to be a radius of curvature on an optical axis of a spherical surface component, k is let to be a conical constant, and $A_4$, $A_6$, $A_8$, $A_{10}$, . . . are let to be aspherical coefficients, and when a shape of the aspheric surface is expressed by the following expression (5)

$$z=h^2/R[1+\{1-(1+k)h^2/R^2\}^{1/2}]+A_4h^4+A_6h^6+A_8h^8+A_{10}h^{10}+\ldots \quad (5),$$

and when an amount of deviation is expressed by the following expression (8)

$$\Delta z=z-h^2/R[1+\{1-h^2/R^2\}^{1/2}] \quad (8),$$

the image forming optical system satisfies the following conditional expression (9)

$$-0.070 \leq [\Delta z_C(h_C)-\{\Delta z_A(h_A)+\Delta z_B(h_B)\}/2]/fw \leq 0.100 \quad (9)$$

where, $z_A(h)$ is a shape of a surface $S_A$ in contact with air of the negative lens $L_{1N}$, which is according to expression (5), $z_B(h)$ is a shape of a surface $S_B$ in contact with air of the positive lens $L_{1P}$, which is according to expression (5), $z_C(h)$ is a shape of a contact surface $S_C$, which is according to expression (5), $\Delta z_A(h)$ is an amount of deviation on the surface $S_A$ in contact with air of the negative lens $L_{1N}$, which is an amount according to expression (8), $\Delta z_B(h)$ is an amount of deviation on the surface $S_B$ in contact with air of the positive lens $L_{1P}$, which is an amount according to expression (8), $\Delta z_C(h)$ is an amount of deviation on (in) the contact surface $S_C$, which is an amount according to expression (8), and $h_A=3.0a$, $h_B=2.5a$, and $h_C=2.5a$, where, a is a quantity according to the following conditional expression (7), $$a=(y_{10})^2 \cdot \log_{10}\gamma/fw \quad (7)$$

and moreover in expression (7), $y_{10}$ is the maximum image height, $\gamma$ is a zooming ratio when focused at the predetermined object point, the predetermined object point is the farthest object point which can be focused, and moreover, for letting an apex of each surface to be an origin point, $z(0)=0$ all the time.

When an amount of deviation of the aspheric surface is excessively substantial, the chromatic aberration of high order is all the more susceptible to be substantial, and accordingly, it is preferable that an upper limit value in conditional expression (9) is not surpassed, as well as a lower limit is not surpassed.

It is more preferable that the image forming optical system satisfies the following conditional expression (9') instead of conditional expression (9)

$$-0.050 \leq [\Delta z_C(h_C)-\{\Delta z_A(h_A)+\Delta z_B(h_B)\}/2]/fw \leq 0.075 \quad (9')$$

Furthermore, it is all the more preferable that the image forming optical system satisfies the following conditional expression (9'') instead of conditional expression (9)

$$-0.035 \leq [\Delta z_C(h_C)-\{\Delta z_A(h_A)+\Delta z_B(h_B)\}/2]/fw \leq 0.055 \quad (9'')$$

Here, any one of the surface $S_A$ in contact with air of the negative lens $L_{1N}$, the surface $S_B$ in contact with air of the positive lens $L_{1P}$, and the contact surface $S_C$ may be a spherical surface.

Moreover, it is preferable that the image forming optical system of the embodiments satisfies the following conditional expression (10).

$$-0.6<(r11+r13)/(r11-r13)<5 \quad (10)$$

where, r11 denotes a radius of curvature near an optical axis of a surface nearest to the object side, of the first lens group, r13 denotes a radius of curvature near an optical axis, of a surface nearest to an image side, of the first lens group.

Conditional expression (10) is a conditional expression regarding a shape of the cemented lens component in the first lens group. In the image forming optical system of the embodiment, the first lens group includes only one lens component. In this case, it is difficult to satisfy the distortion and astigmatism (or coma aberration) simultaneously. Whereas, in a case of a digital camera, the distortion can be corrected easily by image processing, but larger the amount of correction, resolution around screen is susceptible to be degrading. Consequently, distortion of more than a certain degree is not acceptable.

When a lower limit value in conditional expression (10) is surpassed, a barrel distortion at the wide angle end is susceptible to increase. When the distortion which has occurred substantially is corrected by image processing, resolution of a surrounding portion of the image after correction is degraded. Whereas, when an upper limit value in conditional expression (10) is surpassed, correction of astigmatism (or coma aberration) becomes difficult.

It is preferable that the image forming optical system satisfies the following conditional expression (10') instead of conditional expression (10).

$$0.1<(r11+r13)/(r11-r13)<4 \quad (10')$$

Furthermore, it is all the more preferable that the image forming optical system satisfies the following conditional expression (10") instead of conditional expression (10).

$$0.8<(r11+r13)/(r11-r13)<3 \quad (10")$$

Incidentally, for correction of the chromatic aberration, only an axial achromatism and an achromatism of magnification for two wavelengths such as of C-line and F-line, moreover, a high-order component of chromatic aberration such as high-order component (distortion of color) related to an image height of chromatic aberration of magnification and color coma are not sufficient. Moreover, achromatism of other wavelengths, particularly, short wavelengths such as a g-line and an h-line for the F-line is important from a point of sharpness of an image formed, and a removal of spreading of color blur.

Therefore, it is preferable that the image forming optical system of the embodiments satisfies the following conditional expression (11).

$$|(\theta gFp - \theta gFn)/(vdp - vdn)| < 0.0045 \quad (11)$$

where, $\theta gFp$ denotes a partial dispersion ratio $(ng_{1P} - nF_{1P})/(nF_{1P} - nC_{1P})$ of the positive lens $L_{1P}$, $\theta gFn$ denotes a partial dispersion ratio $(ng_{1N} - nF_{1N})/(nF_{1N} - nC_{1N})$ of the negative lens $L_{1N}$, vdp denotes Abbe's number $(nd_{1P} - 1)/(nF_{1P} - nC_{1P})$, vdn denotes Abbe's number $(nd_{1N} - 1)/(nF_{1N} - nC_{1N})$, where, $nd_{1P}$, $nC_{1P}$, $nF_{1P}$, and $ng_{1P}$ denote refractive indices for d-line, C-line, F-line, and g-line respectively, of the positive lens $L_{1P}$, and $nd_{1N}$, $nC_{1N}$, $nF_{1N}$ and $ng_{1N}$ denote refractive indices for d-line, C-line, F-line, and g-line respectively, of the negative lens $L_{1N}$.

Conditional expression (11) is a conditional expression about optical characteristics of a lens material (medium) which forms the first lens group. When an upper limit value in conditional expression (11) is surpassed, even though the achromatism for two wavelengths of the C-line and the F-line is possible, it is difficult to carry out the achromatism for the g-line sufficiently. Therefore, the definition is susceptible to be degraded in an image obtained by image pickup.

Moreover, it is preferable that the image forming optical system of the embodiments satisfies the following conditional expression (12).

$$|(\theta hgp - \theta hgn)/(vdp - vdn)| < 0.0060 \quad (12)$$

where, $\theta hgp$ denotes a partial dispersion ratio $(nh_{1P} - ng_{1P})/(nF_{1P} - nC_{1P})$ of the positive lens $L_{1P}$, $\theta hgn$ denotes a partial dispersion ratio $(nh_{1N} - ng_{1N})/(nF_{1N} - nC_{1N})$ of the negative lens $L_{1N}$, $nh_{1P}$ denotes a refractive index for h-line of the positive lens $L_{1P}$, $nh_{1N}$ denotes a refractive index for h-line of the negative lens $L_{1N}$.

When an upper limit value in conditional expression (12) is surpassed, even though the achromatism for two wavelengths of the C-line and the F-line is possible, it is difficult to carry out the achromatism for the h-line sufficiently.

Therefore, spreading of a purple color is susceptible in an image which is obtained by image pickup.

Moreover, it is desirable that the cemented lens is a compound lens. The compound lens can be realized by curing upon closely sticking a resin as a first lens to a second lens surface. By letting the cemented lens to be a compound lens, it is possible to improve a manufacturing accuracy. Molding is available as a method for manufacturing the compound lens. The molding is a method in which, a first lens material (such as an energy-curable transparent resin) is brought in contact with a second lens, and the first lens material is molded directly on one surface of the second lens. This method is extremely effective for making a lens element thin.

An example of the energy-curable transparent resin is an ultraviolet-curable resin. Moreover, the second lens may be subjected to a surface treatment such as coating in advance, before molding the first lens. Moreover, by forming a surface on at least a cemented side of the second lens by an aspheric surface in advance, making the cemented surface aspherical which has been difficult so far, becomes easy.

From among the embodiments of the image forming optical system of the embodiments, which will be described later, in embodiments from a first embodiment to a fourth embodiment, and a sixth embodiment, for the cemented lens component in the first lens group, a glass material is used for a negative lens element and a resin (particularly an energy-curable resin) is used for a positive lens element. It is desirable to process these cemented lens components by a method described above.

Moreover, when the cemented lens is let to be a compound lens, glass may be molded upon sticking closely as the first lens to the second lens surface. Glass is advantageous from a view point of resistance such as a light resistance and a chemical resistance. In this case, as properties of the first lens material, it is necessary that a melting point and a transition point of the first lens material are lower than a melting point and a transition point of the second lens material. As a method for manufacturing the compound lens, molding is available. This method is extremely effective for making a lens element thin. The second lens may be subjected to a surface treatment such as coating in advance. Moreover, by forming a surface on at least a cemented side of the second lens by an aspheric surface in advance, making the cemented surface aspherical which has been difficult so far, becomes easy.

In a fifth embodiment from among the embodiments of the image forming optical system of the embodiment, in the cemented lens component of the first lens group, glass or a ceramics material having a high transition point is used for the negative lens element, and a glass material having a low transition point (a difference of 100° or more in transition points is preferable and in the embodiments which will be described later, the former is 506° and the latter is 350°) is used for the positive lens element. It is desirable to process these cemented lens components by the method described above.

Next, it is preferable that the image forming optical system of the embodiments satisfy the following conditional expression (13)

$$-0.55 < \beta 234w < -0.25 \quad (13)$$

where,

β234w denotes a combined magnification of the second lens group, the third lens group, and the fourth lens group at the wide angle end when focused on a predetermined object point, and the predetermined object point is the farthest object point which can be focused.

In the image forming optical system of the embodiments, the second lens group and the lens systems onward are a variable power system. Conditional expression (13) is a conditional expression regarding a magnification of this variable power system. When an upper limit value in conditional expression (13) is surpassed, it is difficult to shorten the overall length. Whereas, when a lower limit value in conditional expression (13) is surpassed, an excessive power is imparted to the first lens group, and correction of an oblique aberration becomes difficult.

Moreover, it is preferable that the image forming optical system satisfy the following conditional expressions (14) and (15).

$$1.0 < f2/fw < 2.0 \quad (14)$$

$$-0.05 < (Dw-Dt)/(Dw+Dt) < 0.05 \quad (15)$$

where, f2 denotes a combined focal length of the second lens group,

Dw denotes an overall optical length (a distance from an apex of a surface nearest to the object side up to an image forming surface) at the wide angle end when focused to the predetermined object point, and Dt denotes an overall optical length (a distance from an apex of a surface nearest to the object side up to an image forming surface) at the telephoto end when focused to the predetermined object point, and the predetermined object point is the farthest object point which can be focused.

In the image forming optical system of the embodiments, the second lens group is mainly involved in zooming. When an upper limit value in conditional expression (14) is surpassed, it becomes difficult to shorten the overall length. Whereas, when a lower limit value in conditional expression (14) is surpassed, either it is susceptible to interference with the adjacent lens group, or the correction of the spherical aberration and coma aberration becomes difficult.

Moreover, in the image forming optical system of the embodiments, it is preferable that the second lens group includes in order from the object side, a lens component having a meniscus shape of which a concave surface is directed toward the image side, and a lens component having a biconvex shape. Or, it is preferable that the second lens group includes in order from the object side, a lens component which is formed by cementing a positive lens and a negative lens, and a positive single lens. The reason for this is as follows.

When a three-group negative-lead type zooming optical system is let to be a basic arrangement, in the image forming optical system of the embodiments, it is possible to have an arrangement in which, a fourth lens group is inserted between the third lens group and an image forming surface. Here, for inserting the fourth lens group, it is necessary to shift the second lens group and the third lens group toward the object side in a state of a paraxial arrangement such as a power and positions of principal points maintained such that the overall length is not elongated.

A method thereof will be described below.

A distance L between principal points on the image side of the first lens group and principal points on the object side of the second lens group is expressed as follows.

$$L = (1-\beta 1) \times f1 + \{1 - (1/\beta 2)\} \times f2$$

where,

β1 is a magnification of the first lens group,
β2 is a magnification of the second lens group,
f1 is a focal length of the first lens group, and
f2 is a focal length of the second lens group.

Zooming from the wide angle end to the telephoto end is equivalent to increase β2 on a negative side. Moreover, since f2 is positive in the negative-lead type zooming optical system, L becomes smallest at the telephoto end.

Therefore, in a general negative-lead type zooming optical system, in order that no interference (collision) occurs between the first lens group and the second lens group at the telephoto end, or in order that there is no wasteful vacant space between the two lens groups conversely, the first lens group which has a negative refracting power includes two lens components or three lens component, and the second lens group which has a positive refracting power includes in order from the object side, a positive lens component and a negative lens component.

Incidentally, as in the image forming optical system of the embodiment, when the first lens group which is negative, includes one lens component, there appears a vacant space between the first lens group and the second lens group. Therefore, in the image forming optical system of the embodiments, this vacant space is moved toward the image side of the second lens group, and a vacant space for inserting a new lens group is formed on the image side of the second lens group. Therefore, in the image forming optical system of the embodiments, the second lens group includes in order from the object side, the lens component of a meniscus shape having a concave surface directed toward the object side, and the lens component of a biconvex shape. By adopting such an arrangement, the second lens group as a whole is positioned toward the first lens group than in a normal example. In other words, a position of an object side surface and a position of an image side surface of the second lens group are inclined comparatively toward the first lens group with respect to the position of principal points of the second lens group. Accordingly, the wasteful vacant space toward the object side of the second lens group is eliminated, and instead, it is possible to form a vacant space on the image side. As a result, it is possible to dispose a new lens group in this vacant space.

Moreover, it is preferable that the image forming optical system of the embodiments satisfies the following conditional expression (16)

$$0.5 < r23/r21 < 1.5 \quad (16)$$

where, r21 denotes a radius of curvature of a surface nearest to the object side of a lens component on the object side in the second lens group, and r23 denotes a radius of curvature of a surface nearest to the image side of the lens component on the object side in the second lens group, and both r23 and r21 are radii of curvature near the optical axis.

When an upper limit in conditional expression (16) is surpassed, it is advantageous for correction of the spherical aberration, the coma aberration, and the astigmatism, but an effect of reducing a sensitivity of decentering at the cemented surface is small. Whereas, when a lower limit value in conditional expression (16) is surpassed, the correction of the spherical aberration, the coma aberration, and the astigmatism is susceptible to become difficult.

It is more preferable, that the image forming optical system of the embodiments satisfies the following conditional expression (16') instead of conditional expression (16)

$$0.6<r23/r21<1.3 \qquad (16')$$

Furthermore, it is all the more preferable that the image forming optical system of the embodiments satisfies the following conditional expression (16") instead of conditional expression (16).

$$0.7<r23/r21<1.1 \qquad (16'')$$

Moreover, it is preferable that the image forming optical system of the embodiment satisfies the following conditional expressions (17) and (18).

$$0.0<(r21+r23)/r22<1.3 \qquad (17)$$

$$-1.0<(r24+r25)/(r24-r25)<1.0 \qquad (18)$$

where, r22 denotes a radius of curvature of a cemented surface of a lens component on the object side, in the second lens group, r24 denotes a radius of curvature of a surface nearest to the object side of a lens component on the image side, in the second lens group, and r25 denotes a radius of curvature of a surface nearest to the image side of the lens component on the image side, in the second lens group, and each of r22, r24, and r25 is a radius of curvature near an optical axis.

When an upper limit value in conditional expression (17) is surpassed, correction of a longitudinal chromatic aberration at the wide angle side in particular, is susceptible to be insufficient. Whereas, when a lower limit value in conditional expression (17) is surpassed, correction of the spherical aberration and the coma aberration, or the astigmatism is difficult.

Conditional expression (18) is a regulation related to a shape factor of the lens component on the image side of the second lens group. When a lower limit value in conditional expression (18) is surpassed, it is easy to make thin an air distance $d_{22}$ of the second lens group, but correction of the coma aberration or the astigmatism becomes difficult. When an upper limit value in conditional expression (18) is surpassed, an axial distance tends to increase due to an interference of an edge portion of both lens components of the second lens group. Therefore, it becomes difficult to reduce a lens barrel thickness.

It is more preferable that the image forming optical system satisfies the following conditional expression (17') instead of conditional expression (17).

$$0.3<(r21+r23)/r22<1.2 \qquad (17')$$

Furthermore, it is all the more preferable that the image forming optical system satisfies the following conditional expression (17") instead of conditional expression (17)

$$0.6<(r21+r23)/r22<1.1 \qquad (17'')$$

It is preferable that the image forming optical system satisfies the following conditional expression (18') instead of conditional expression (18).

$$-0.9<(r24+r25)/(r24-r25)<0.7 \qquad (18')$$

Furthermore, it is all the more preferable that the image forming optical system satisfies the following conditional expression (18") instead of conditional expression (18).

$$-0.8<(r24+r25)/(r24-r25)<0.4 \qquad (18'')$$

Incidentally, in the image forming optical system of the embodiments, the second lens group can include in order from the object side, a positive lens component, and a negative lens component having a concave surface directed toward the image side. In this case, particularly, it is preferable that the negative lens component is made by sticking in order from the object side, a positive lens element and a negative lens element.

Moreover, it is preferable that the image forming optical system of the embodiments satisfies one of the following conditional expressions (b) and (c).

$$0.2<r'25/r'23<0.9 \qquad (b)$$

$$-0.4<(r'23+r'25)/r'24<0.6 \qquad (c)$$

where, r'23 is a radius of curvature of a surface nearest to the object side of a lens component on the image side in the second lens group, r'24 is a radius of curvature of a cemented surface of the lens component on the image side in the second lens group, r'25 is a radius of curvature of a surface nearest to the image side of the lens component on the image side in the second lens group, and each of r'23, r'24, and r'25 is a radius of curvature near the optical axis.

When an upper limit value in conditional expression (b) is surpassed, it is advantageous for correction of the spherical aberration, the coma aberration, and the astigmatism, but an effect of reducing the sensitivity of decentering by cementing is small. Whereas, when a lower limit value in conditional expression (b) is surpassed, the correction of the spherical aberration, the coma aberration, and the astigmatism is susceptible to become difficult.

When an upper limit value in conditional expression (c) is surpassed, correction of the longitudinal chromatic aberration at the wide angle end in particular, is susceptible to be insufficient. Whereas, when a lower limit value in conditional expression (c) is surpassed, correction of the spherical aberration and the coma aberration, or the astigmatism is difficult.

It is more preferable that the image forming optical system satisfies the following conditional expression (b') instead of conditional expression (b)

$$0.3<r'25/r'23<0.8 \qquad (b')$$

Furthermore, it is all the more preferable that the image forming optical system satisfies the following conditional expression (b") instead of conditional expression (b).

$$0.4<r'25/r'23<0.7 \qquad (b'')$$

It is more preferable that the image forming optical system satisfies the following conditional expression (c') instead of conditional expression (c).

$$-0.2<(r'23+r'25)/r'24<0.6 \qquad (c')$$

Furthermore, it is all the more preferable that the image forming optical system satisfies the following conditional expression (c") instead of conditional expression (c).

$$0.0<(r'23+r'25)/r'24<0.6 \qquad (c'')$$

Moreover, it is preferable that the image forming optical system of the embodiments satisfies the following conditional expression (19).

$$1.0<\beta 34t/\beta 34w<1.7 \qquad (19)$$

where,

β34w denotes a combined zooming ratio of the third lens group and the fourth lens group at the wide angle end, when focused on the predetermined object point, β34t denotes a combined zooming ratio of the third lens group and the fourth lens group at the telephoto end, when focused on the predetermined object point, and the predetermined object point is the farthest object point that can be focused.

When an upper limit value in conditional expression (19) is surpassed, it is possible to reduce a load of aberration correction on the first lens group and the second lens group, but a fluctuation due to variable power of the chromatic aberration of magnification is susceptible to become substantial. Whereas, when a lower limit value in conditional expression (19) is surpassed, since the overall length and a diameter of the first lens group becomes substantial, it incurs an increase in side of the optical system.

It is more preferable that the image forming optical system satisfies the following conditional expression (19') instead of conditional expression (19).

$$1.1 < \beta34t/\beta34w < 1.7 \quad (19')$$

Furthermore, it is all the more preferable that the image forming optical system satisfies the following conditional expression (19") instead of conditional expression (19).

Moreover, it is preferable that the image forming optical system of the embodiments satisfies the following conditional expressions (20) and (21).

$$0 < fw/f34w < 0.6 \quad (20)$$

$$0.2 < -f4/f3 < 6 \quad (21)$$

where, f34w denotes a combined focal length of the third lens-group and the fourth lens group at the wide angle end, when focused on the predetermined object point, f3 denotes a focal length of the third lens group, f4 denotes a focal length of the fourth lens group, and the predetermined object point is the farthest object point which can be focused.

It is preferable to let the rear lens groups (the third lens group and the fourth lens group) which form the variable power system to have a positive refracting power from a view point of correction of the longitudinal aberration, but it is not preferable from a point of correction of Petzval's sum. Consequently, it is preferable that conditional expressions (20) and (21) are satisfied simultaneously. When an upper limit value in conditional expressions (20) and (21) is surpassed, Petzval's sum is susceptible to be a substantial positive value. Whereas, when a lower limit value in conditional expressions (20) and (21) is surpassed, a fluctuation in the coma aberration and the astigmatism at the time of zooming is susceptible to become substantial.

It is more preferable that the image forming optical system satisfies the following conditional expression (20') instead of conditional expression (20).

$$0 < fw/f34w < 0.45 \quad (20')$$

It is all the more preferable that the image forming optical system satisfies the following conditional expression (20") instead of conditional expression (20).

$$0 < fw/f34w < 0.3 \quad (20'')$$

It is more preferable that the image forming optical system satisfies the following conditional expression (21') instead of conditional expression (21).

$$0.2 < -f4/f3 < 3.5 \quad (21')$$

It is all the more preferable that the image forming optical system satisfies the following conditional expression (21") instead of conditional expression (21).

$$0.2 < -f4/f3 < 1.6 \quad (21'')$$

Moreover, it is preferable that in the image forming optical system of the embodiments, the third lens group includes only one lens component. Moreover, it is preferable that the third lens group includes only a single lens. When such an arrangement is made, it is possible to carry out further slimming of the optical system.

Moreover, it is preferable that the image forming optical system of the embodiments satisfy the following conditional expression (22).

$$0.3 < r31/r25 < 3 \quad (22)$$

where, r25 denotes a radius of curvature of a surface nearest to the image side, of the second lens group, and r31 denotes a radius of curvature of a surface nearest to the object side, of the third lens group, and each of r25 and r31 is a radius of curvature near an optical axis.

At the time of collapsing a lens barrel of the optical system, when a radius of curvature of adjacent lens surfaces between the lens groups are nearly same, it does not give rise to a dead space. When an upper limit value in conditional expression (22) is surpassed, or when a lower limit value in conditional expression (22) is surpassed, it becomes difficult to reduce a thickness when the lens barrel of the optical system is collapsed.

Moreover, it is preferable that the image forming optical system of the embodiments satisfy the following conditional expression (23).

$$0.4 < r32/r41 < 1.4 \quad (23)$$

where, r32 denotes a radius of curvature of a surface nearest to the image side, of the third lens group, and r41 denotes a radius of curvature of a surface nearest to the object side, of the fourth lens group, and each of r32 and r41 is a radius of curvature near an optical axis.

When an upper limit value in conditional expression (23) is surpassed, or when a lower limit value in conditional expression (23) is surpassed, it becomes difficult to reduce a thickness when the lens barrel of the optical system is collapsed.

Moreover, in the image forming optical system of the embodiments, it is preferable that an apex surface nearest to the object side of the third lens group is positioned all the time on the image side of an apex surface position nearest to the image side of the second lens group at the wide angle end.

It is preferable to carry out focusing by the third lens group. In this case, the second lens group moves at the time of zooming, and the third lens group moves at the time of zooming and at the time of focusing. Here, when small sizing of zooming and focusing actuator is taken into consideration, it is preferable that a space in which the second lens group moves and a space in which the third lens group do not overlap. Moreover, when the third lens group moves closer to the second lens group, it negates contribution of the second lens group to the zooming, and a fluctuation in correction of the chromatic aberration due to zooming is susceptible to become substantial. Consequently, it is preferable that the apex surface nearest to the object side of the third lens group is positioned all the time on the image side of the apex surface position nearest to the image side of the second lens group at the wide angle end.

Moreover, in the image forming optical system of the embodiments, it is preferable to let a lens surface nearest to an aperture stop to be a surface nearest to the object side of the second lens group. A change in an F value at the time of zooming is also susceptible to cause a problem. Here, the F value is determined by the aperture stop. Therefore, when the abovementioned arrangement is made, the change in the F value becomes small.

Embodiments

Figure 1B:
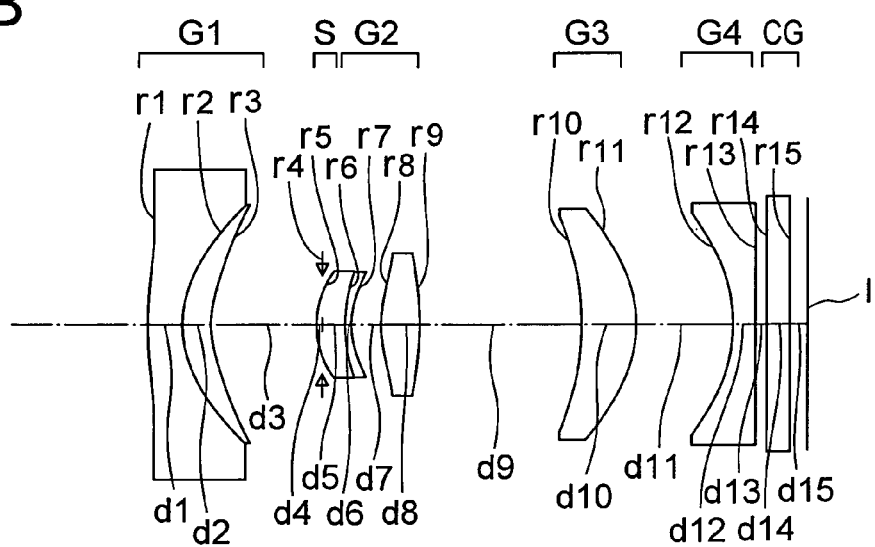
Figure 1C:
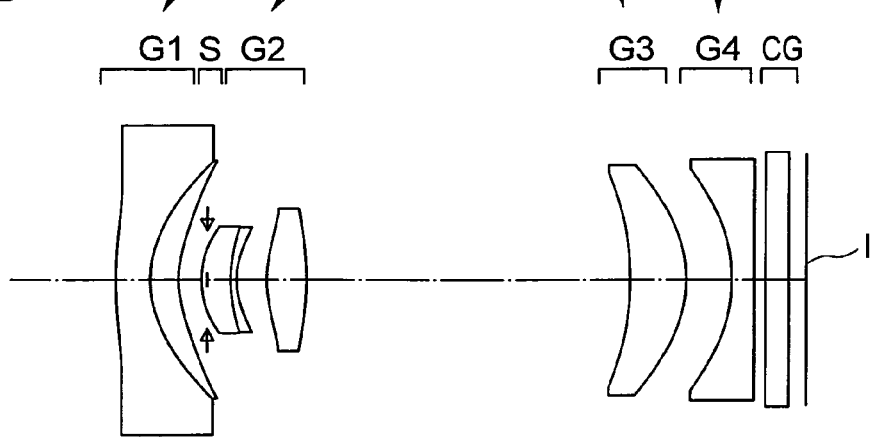

Next, a zoom lens system according to a first embodiment of the present invention will be described below. FIG. 1A, FIG. 1B, and FIG. 1C are cross-sectional views along an optical axis showing an optical arrangement at a time of infinite object point focusing of the zoom lens system according to the first embodiment of the present invention, where, FIG. 1A shows a state at a wide angle end, FIG. 1B shows an intermediate focal length state, and FIG. 1C shows a state at a telephoto end.

Figure 2A:
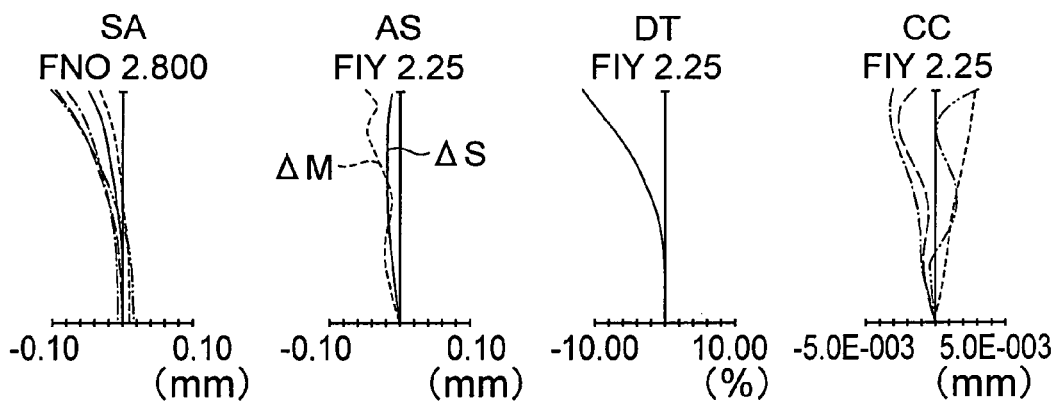
FIG. 2A, FIG. 2B, and FIG. 2C are diagrams showing a spherical aberration, an astigmatism, a distortion, and a chromatic aberration of magnification at the time of infinite object point focusing of the zoom lens system according to the first embodiment, where.
Figure 2B:
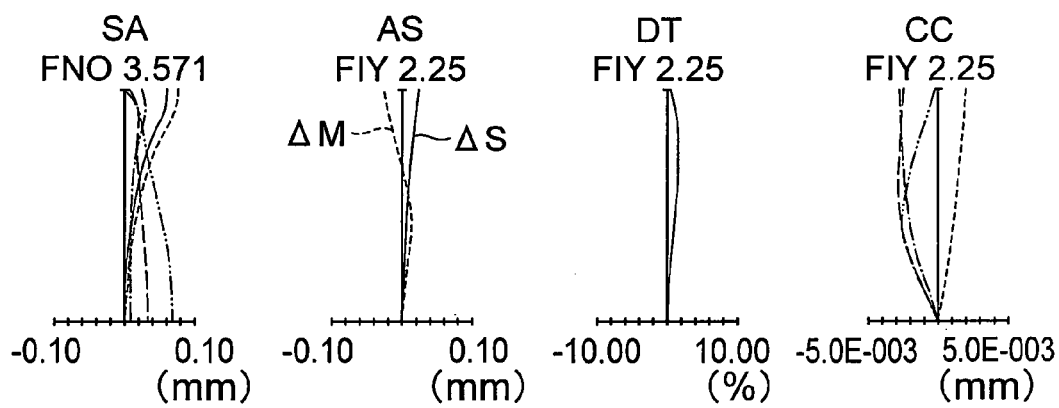
Figure 2C:
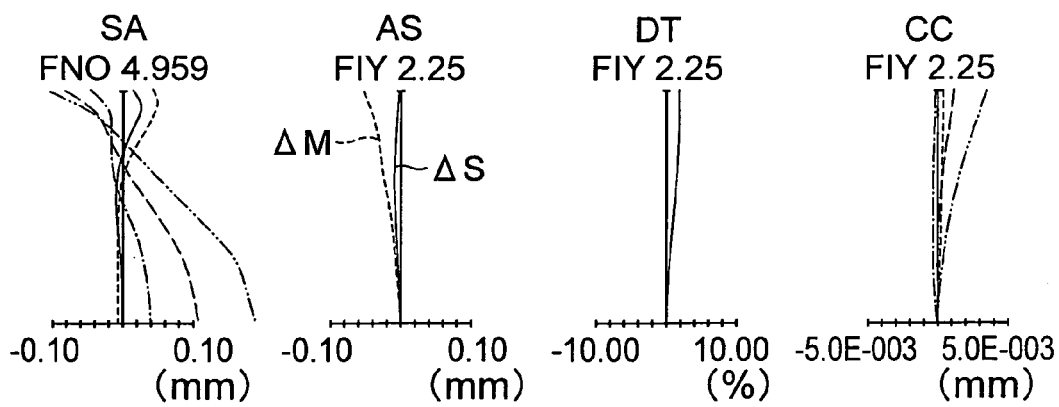
Figure 3A:
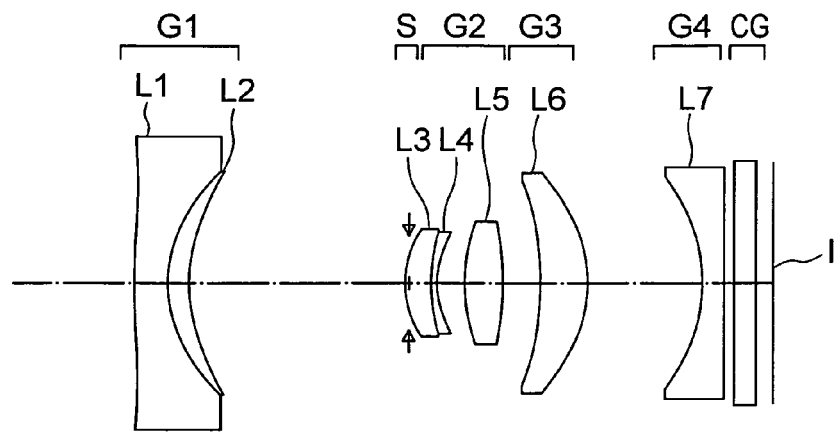
FIG. 3A, FIG. 3B, and FIG. 3C are lens cross-sectional views at the time of infinite object point focusing of a zoom lens system according to a second embodiment of the present invention, where.
Figure 3B:
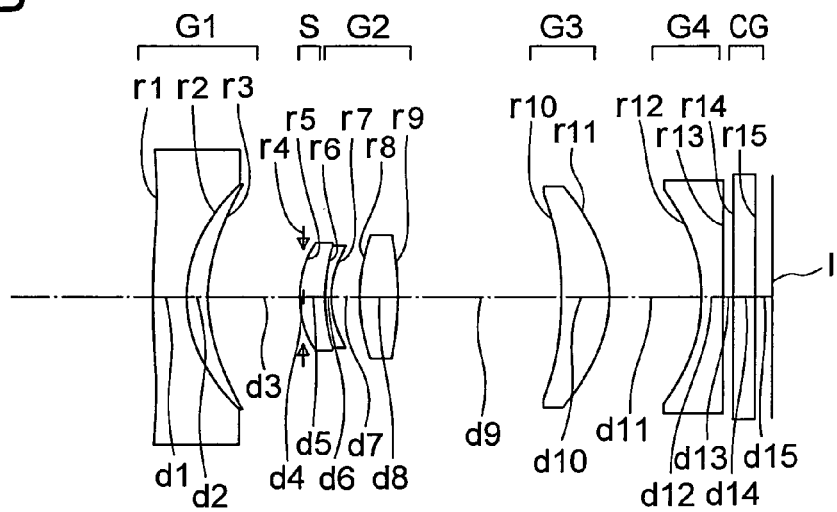
Figure 3C:
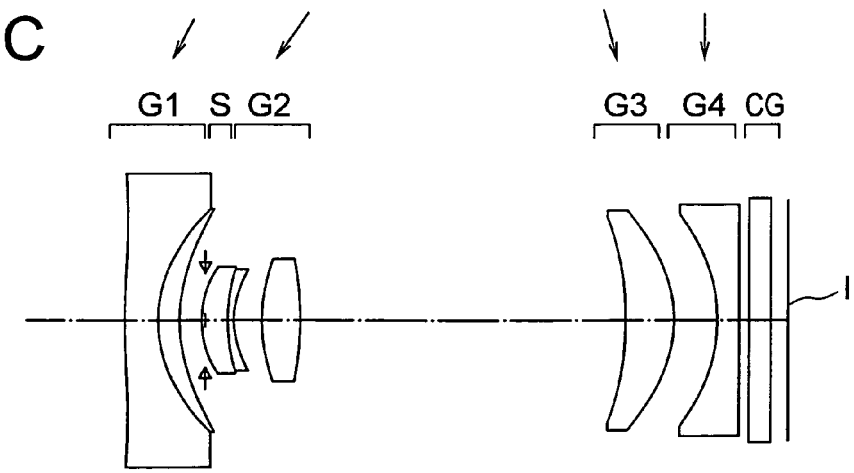

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens system according to the first embodiment, where, FIG. 2A shows a state at the wide angle end, FIG. 2B shows an intermediate focal length state, and FIG. 3C shows a state at the telephoto end. Moreover, FIY denotes an image height. Reference numerals in the aberration diagrams are same in the embodiments which will be described later.

The zoom lens system of the first embodiment, as shown in FIG. 1A, FIG. 1B, and FIG. 1C, includes in order from an object side, a first lens group G1 having a negative refracting power, an aperture stop S, a second lens group G2 having a positive refracting power, a third lens group G3 having a positive refracting power, and a fourth lens group G4 having a negative refracting power. In all the embodiments which will be described below, LPF denotes a low pass filter, CG denotes a cover glass, and I denotes an image pickup surface of an electronic image pickup element.

The first lens group G1, includes in order from an object side, a cemented lens of a negative meniscus lens L1 having a convex surface directed toward the object side and a positive meniscus lens L2 having a convex surface directed toward the object side, and has a negative refracting power as a whole.

The second lens group G2, includes in order from the object side, a cemented lens of a positive meniscus lens L3 having a concave surface directed toward an image side and a negative meniscus lens L4 having a concave surface directed toward the image side, and a biconvex positive lens L5, and has a positive refracting power as a whole.

The third lens group G3 includes a positive meniscus lens L6 having a convex surface directed toward the image side, and has a positive refracting power as a whole.

The fourth lens group G4 includes a biconcave negative lens L7, and has a negative refracting power as a whole.

At the time of zooming from the wide angle end to the telephoto end, the first lens group G1, after moving toward the image side, moves toward the object side. The second lens group G2 moves toward the object side. The third lens group G3 moves toward the image side. The fourth lens group G4 is fixed.

An aspheric surface is provided to eight surfaces namely, a surface on the object side of the negative meniscus lens L1, a surface on the image side of the positive meniscus lens L2, and a cemented surface of the negative meniscus lens L1 and the positive meniscus lens L2 in the first lens group G1, a surface on the object side of the positive meniscus lens L3, a surface on the image side of the negative meniscus lens L4, and a surface on the object side of the biconvex positive lens L5 in the second lens group G2, a surface on the image side of the positive meniscus lens L6 in the third lens group, and a surface on the object side of the biconcave negative lens L7 in the fourth lens group.

Next, a zoom lens system according to a second embodiment of the present invention will be described below. FIG. 3A, FIG. 3B, and FIG. 3C are lens cross-sectional views along an optical axis showing an arrangement at the time of infinite object point focusing of the zoom lens system according to the second embodiment of the present invention, where, FIG. 3A shows a state at the wide angle end, FIG. 3B shows an intermediate focal length state, and FIG. 3C shows a state at the telephoto end.

Figure 4A:
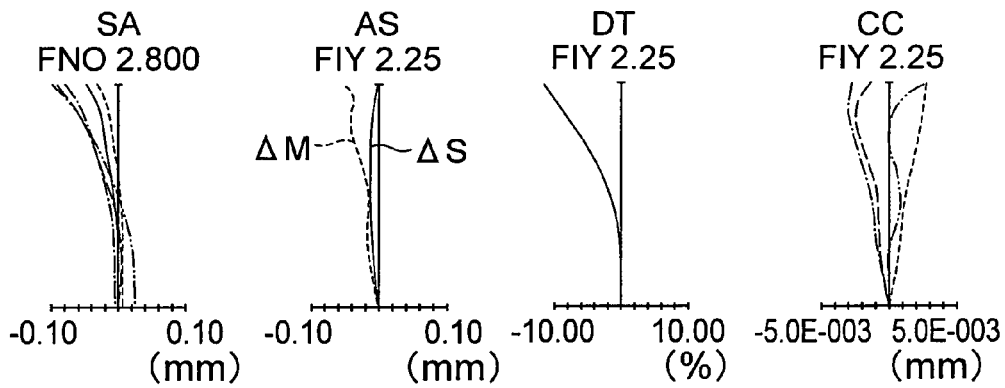
FIG. 4A, FIG. 4B, and FIG. 4C are diagrams showing a spherical aberration, an astigmatism, a distortion, and a chromatic aberration of magnification at the time of infinite object point focusing of the zoom lens system according to the second embodiment, where.
Figure 4B:
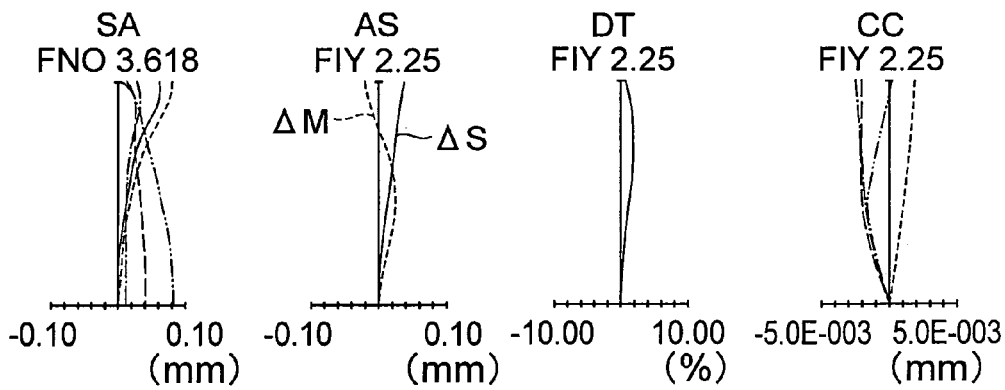
Figure 4C:
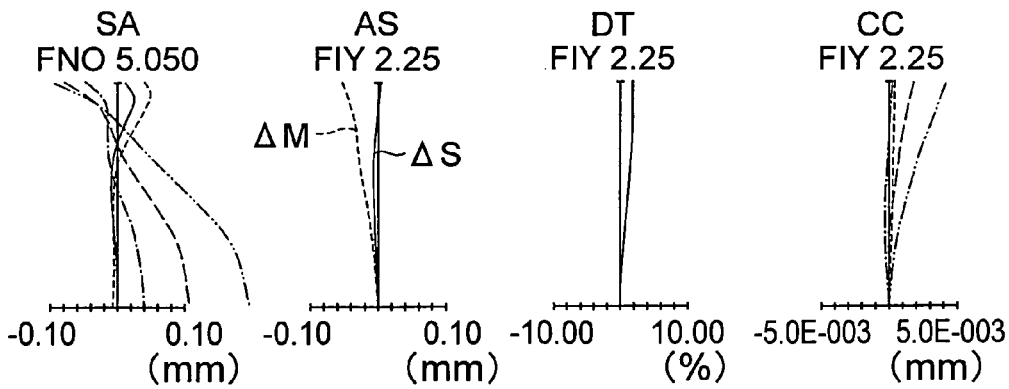

FIG. 4A, FIG. 4B, and FIG. 4C are diagrams showing a spherical aberration, an astigmatism, a distortion, and a chromatic aberration of magnification at the time of infinite object point focusing of the zoom lens system according to the second embodiment, where, FIG. 4A shows a state at the wide angle end, FIG. 4B shows an intermediate focal length state, and FIG. 4C shows a state at the telephoto end.

The zoom lens system of the second embodiment, as shown in FIG. 3A, FIG. 3B, and FIG. 3C, includes in order from an object side, a first lens group G1 having a negative refracting power, an aperture stop S, a second lens group G2 having a positive refracting power, a third lens group G3 having a positive refracting power, and a fourth lens group G4 having a negative refracting power.

The first lens group G1, includes in order from the object side, a cemented lens of a negative meniscus lens L1 having a convex surface directed toward the object side and a positive meniscus lens L2 having a convex surface directed toward the object side, and has a negative refracting power as a whole.

The second lens group G2, includes in order from the object side, a cemented lens of a positive meniscus lens L3 having a concave surface directed toward the image side and a negative meniscus lens L4 having a concave surface directed toward the image side, and a biconvex positive lens L5, and has a positive refracting power as a whole.

The third lens group G3 includes a positive meniscus lens L6 having a convex surface directed toward the image side, and has a positive refracting power as a whole.

The fourth lens group G4 includes a biconcave negative lens L7, and has a negative refracting power as a whole.

At the time of zooming from the wide angle end to the telephoto end, the first lens group G1, after moving toward the image side, moves toward the object side. The second lens group G2 moves toward the object side. The third lens group G3 moves toward the image side. The fourth lens group G4 is fixed.

An aspheric surface is provided to eight surfaces namely, a surface on the object side of the negative meniscus lens L1, a surface on the image side of the positive meniscus lens L2, and a cemented surface of the negative meniscus lens L1 and the positive meniscus lens L2 in the first lens group G1, a surface on the object side of the positive meniscus lens L3, a surface on the image side of the negative meniscus lens L4, and a surface on the object side of the biconvex positive lens L5 in the second lens group G2, a surface on the image side of the positive meniscus lens L6 in the third lens group G3, and a surface on the object side of the biconcave negative lens L7 in the fourth lens group G4.

Figure 5A:
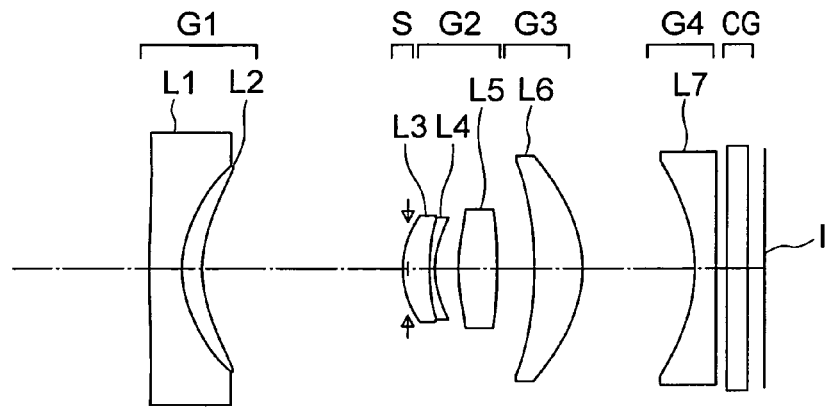
FIG. 5A, FIG. 5B, and FIG. 5C are lens cross-sectional views at the time of infinite object point focusing of a zoom lens system according to a third embodiment of the present invention, where.
Figure 5B:
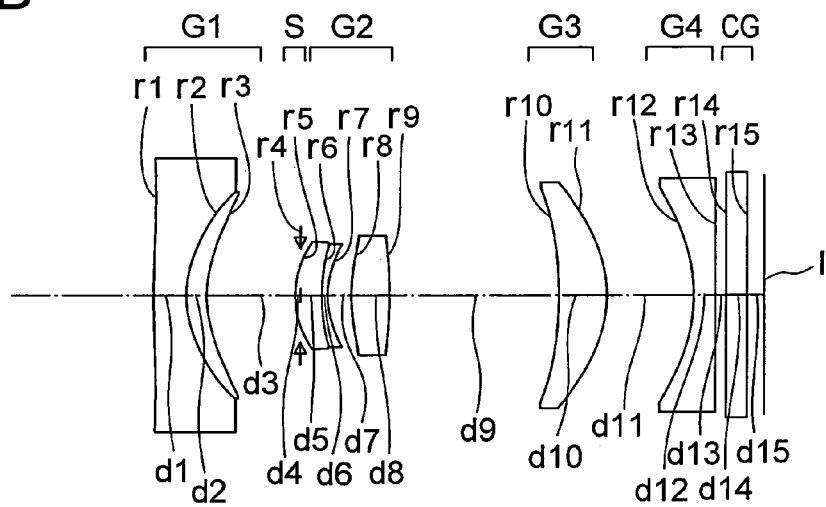
Figure 5C:
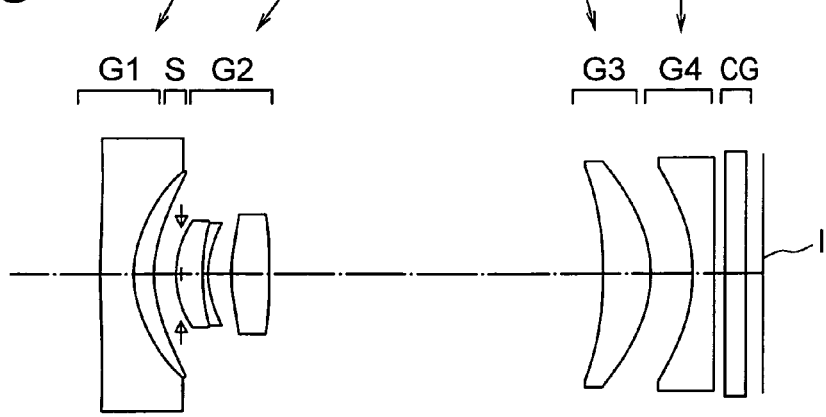

Next, a zoom lens system according to a third embodiment of the present invention will be described below. FIG. 5A, FIG. 5B, and FIG. 5C are lens cross-sectional views taken along an optical axis showing an optical arrangement at the time of infinite object point focusing of the zoom lens system according to the third embodiment of the present invention, where, FIG. 5A shows a state at the wide angle end, FIG. 5B shows an intermediate focal length state, and FIG. 5C shows a state at the telephoto end.

Figure 6A:
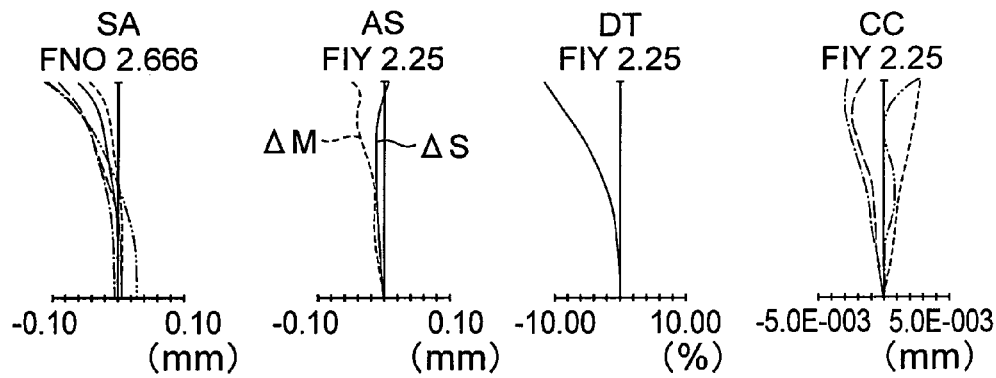
FIG. 6A, FIG. 6B, and FIG. 6C are diagrams showing a spherical aberration, an astigmatism, a distortion, and a chromatic aberration of magnification at the time of infinite object point focusing of the zoom lens system according to the third embodiment, where.
Figure 6B:
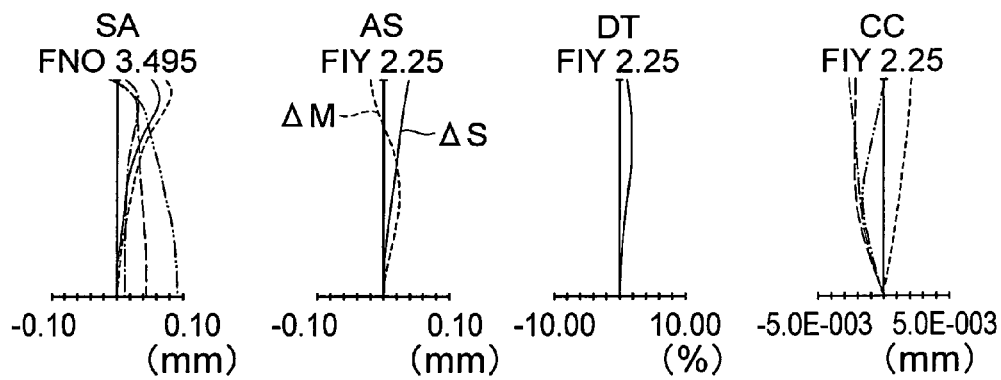
Figure 6C:
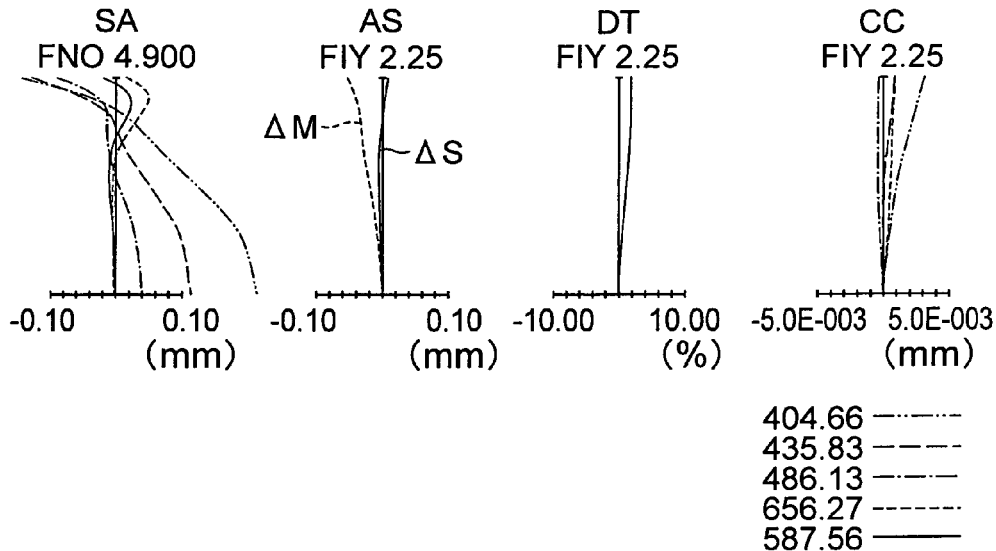

FIG. 6A, FIG. 6B, and FIG. 6C are diagrams showing a spherical aberration, an astigmatism, a distortion, and a chromatic aberration of magnification at the time of infinite object point focusing of the zoom lens system according to the third embodiment, where, FIG. 6A shows a state at the wide angle end, FIG. 6B shows an intermediate focal length state, and FIG. 6C shows a state at the telephoto end.

The zoom lens system of the third embodiment, as shown in FIG. 5A, FIG. 5B, and FIG. 5C, includes in order from an object side, a first lens group G1 having a negative refracting power, an aperture stop S, a second lens group G2 having a positive refracting power, a third lens group G3 having a positive refracting power, and a fourth lens group G4 having a negative refracting power.

The first lens group G1, includes in order from the object side, a cemented lens of a negative meniscus lens L1 having a convex surface directed toward the object side and a positive meniscus lens L2 having a convex surface directed toward the object side, and has a negative refracting power as a whole.

The second lens group G2, includes in order from the object side, a cemented lens of a positive meniscus lens L3 having a concave surface directed toward the image side and a negative meniscus lens L4 having a concave surface directed toward the image side, and a biconvex positive lens L5, and has a positive refracting power as a whole.

The third lens group G3 includes a positive meniscus lens L3 having a convex surface directed toward the image side, and has a positive refracting power as a whole.

The fourth lens group G4 includes a biconcave negative lens L7, and has a negative refracting power as a whole.

At the time of zooming from the wide angle end to the telephoto end, the first lens group G1, after moving toward the image side, moves toward the object side. The second lens group G2 moves toward the object side. The third lens group G3 moves toward the image side. The fourth lens group G4 is fixed.

An aspheric surface is provided to eight surfaces namely, a surface on the object side of the negative meniscus lens L1, a surface on the image side of the positive meniscus lens L2, and a cemented surface of the negative meniscus lens L1 and the positive meniscus lens L2 in the first lens group G1, a surface on the object side of the positive meniscus lens L3, a surface on the image side of the negative meniscus lens L4, and a surface on the object side of the biconvex positive lens L5 in the second lens group G2, a surface on the image side of the positive meniscus lens L6 in the third lens group G3, and a surface on the object side of the biconcave negative lens L7 in the fourth lens group G4.

Figure 7A:
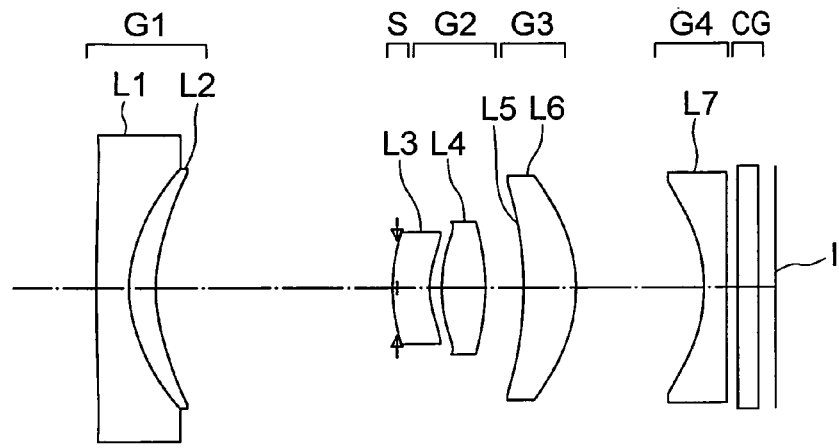
FIG. 7A, FIG. 7B, and FIG. 7C are lens cross-sectional views at the time of infinite object point focusing of a zoom lens system according to a fourth embodiment of the present invention, where.
Figure 7B:
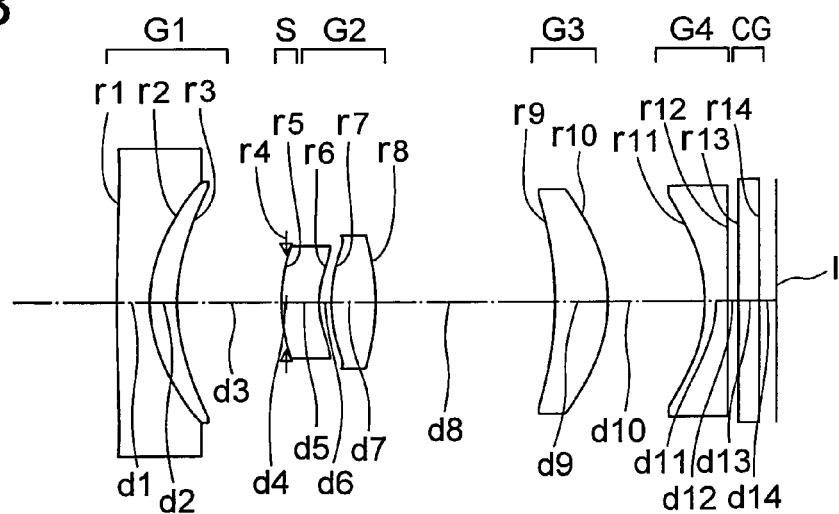
Figure 7C:
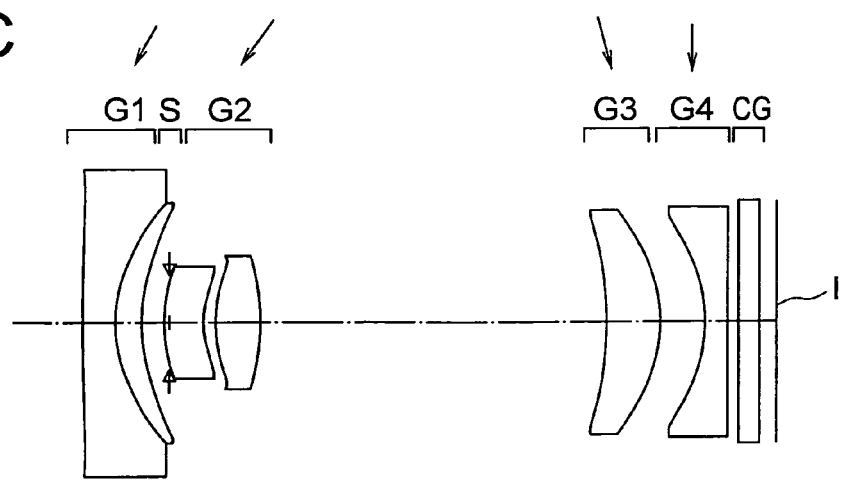

Next, a zoom lens system according to a fourth embodiment of the present invention will be described below. FIG. 7A, FIG. 7B, and FIG. 7C are lens cross-sectional views taken along an optical axis showing an optical arrangement at the time of infinite object point focusing of the zoom lens system according to the fourth embodiment, where, FIG. 7A shows a state at the wide angle end, FIG. 7B shows an intermediate focal length state, and FIG. 7C shows a state at the telephoto end.

Figure 8A:
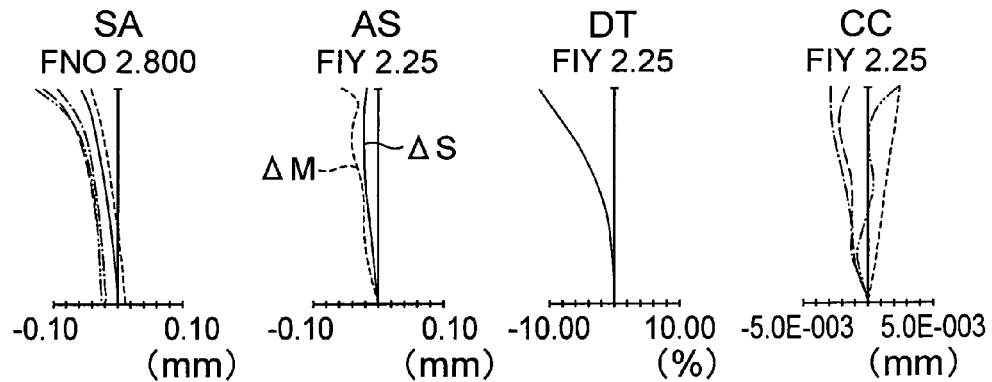
FIG. 8A, FIG. 8B, and FIG. 8C are diagrams showing a spherical aberration, an astigmatism, a distortion, and a chromatic aberration of magnification at the time of infinite object point focusing of the zoom lens system according to the fourth embodiment, where.
Figure 8B:
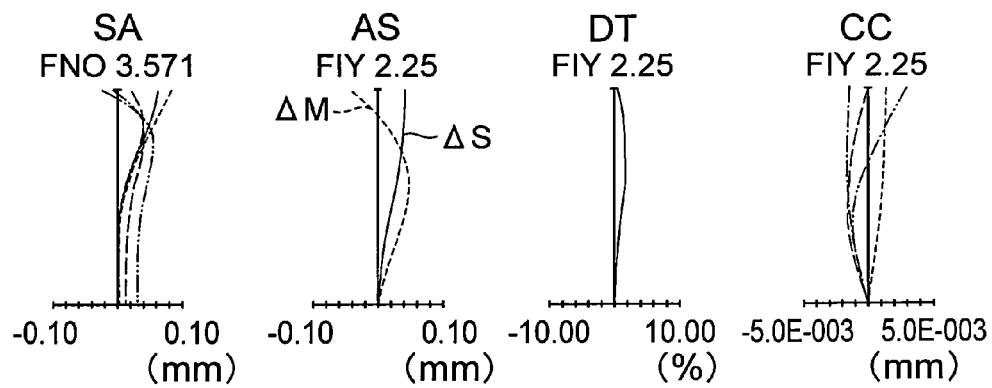
Figure 8C:
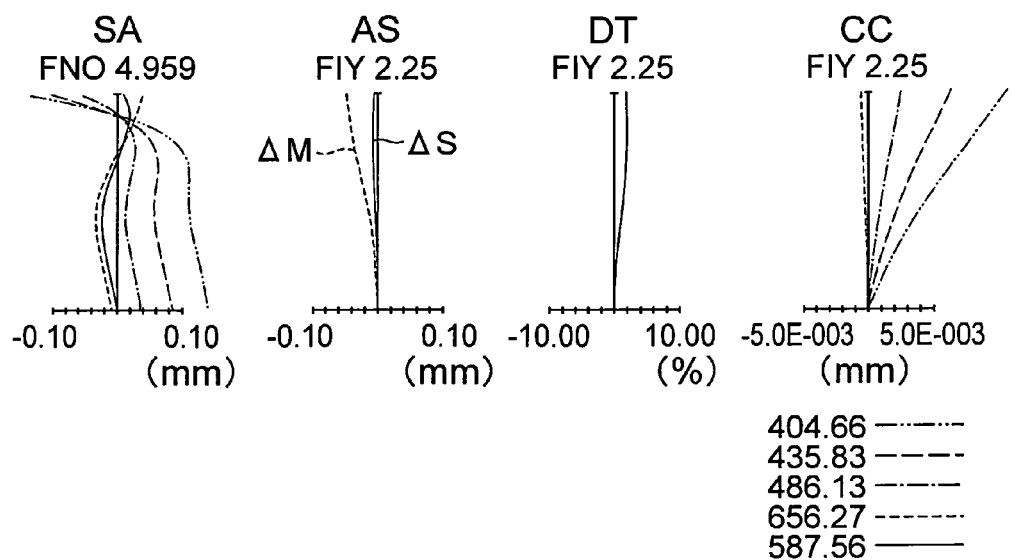

FIG. 8A, FIG. 8B, and FIG. 8C are diagrams showing a spherical aberration, an astigmatism, a distortion, and a chromatic aberration of magnification at the time of infinite object point focusing of the zoom lens system according to the fourth embodiment, where, FIG. 8A shows a state at the wide angle end, FIG. 8B shows an intermediate focal length state, and FIG. 8C shows a state at the telephoto end.

The zoom lens system of the fourth embodiment, as shown in FIG. 7A, FIG. 7B, and FIG. 7C, includes in order from an object side, a first lens group G1 having a negative refracting power, an aperture stop S, a second lens group G2 having a positive refracting power, a third lens group G3 having a positive refracting power, and a fourth lens group G4 having a negative refracting power.

The first lens group G1 includes a cemented lens of a negative meniscus lens L1 having a convex surface directed toward the object side and a positive meniscus lens L2 having a convex surface directed toward the object side, and has a negative refracting power as a whole.

The second lens group G2, includes in order from the object side, a negative meniscus lens L3 having a concave surface directed toward an image side, and a biconvex positive lens L4, and has a positive refracting power as a whole.

The third lens group G3 includes a positive meniscus lens L5 having a convex surface directed toward the image side, and has a positive refracting power as a whole.

The fourth lens group G4 includes a biconcave negative lens L6, and has a negative refracting power as a whole.

At the time of zooming from the wide angle end to the telephoto end, the first lens group G1, after moving toward the image side, moves toward the object side, the second lens group G2 moves toward the object side. The third lens group G3 moves toward the image side. The fourth lens group G4 is fixed.

An aspheric surface is provided to nine surfaces namely, a surface on the object side of the negative meniscus lens L1, a surface on the image side of the positive meniscus lens L2, and a cemented surface of the negative meniscus lens L1 and the positive meniscus lens L2 in the first lens group G1, both surfaces of the negative meniscus lens L3, and both surfaces of the biconvex positive lens L4 in the second lens group G2, a surface on the image side of the positive meniscus lens L5 in the third lens group G3, and a surface on the object side of the biconcave negative lens L6 in the fourth lens group G4.

Figure 9A:
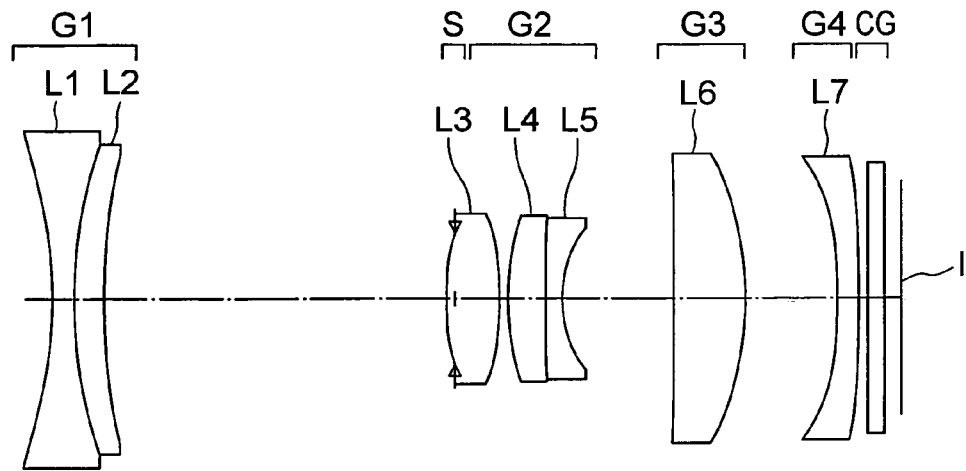
FIG. 9A, FIG. 9B, and FIG. 9C are lens cross-sectional views at the time of infinite object point focusing of a zoom lens system according to a fifth embodiment of the present invention, where.
Figure 9B:
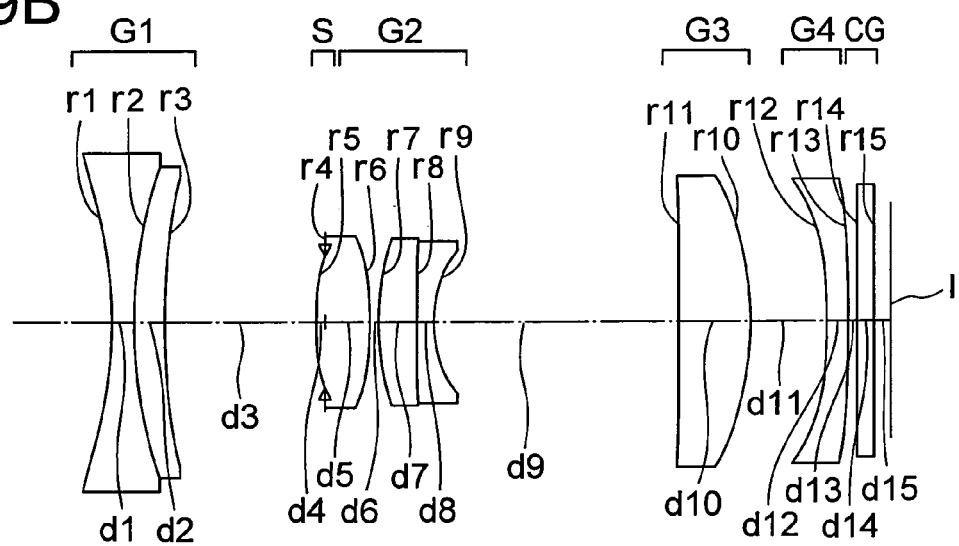
Figure 9C:
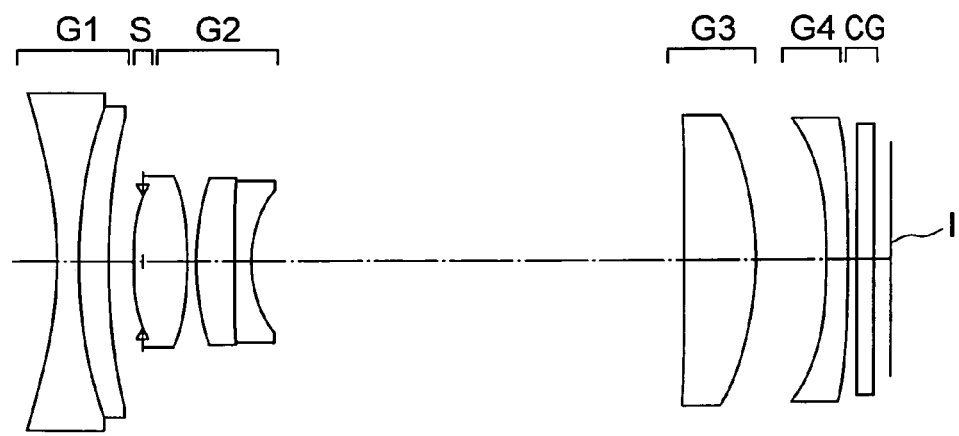

Next, a zoom lens system according to a fifth embodiment of the present invention will be described below. FIG. 9A, FIG. 9B, and FIG. 9C are lens cross-sectional views taken along an optical axis showing an optical arrangement at the time of infinite object point focusing of the zoom lens system according to the fifth embodiment, where, FIG. 9A shows a state at the wide angle end, FIG. 9B shows an intermediate focal length state, and FIG. 9C shows a state at the telephoto end.

Figure 10A:
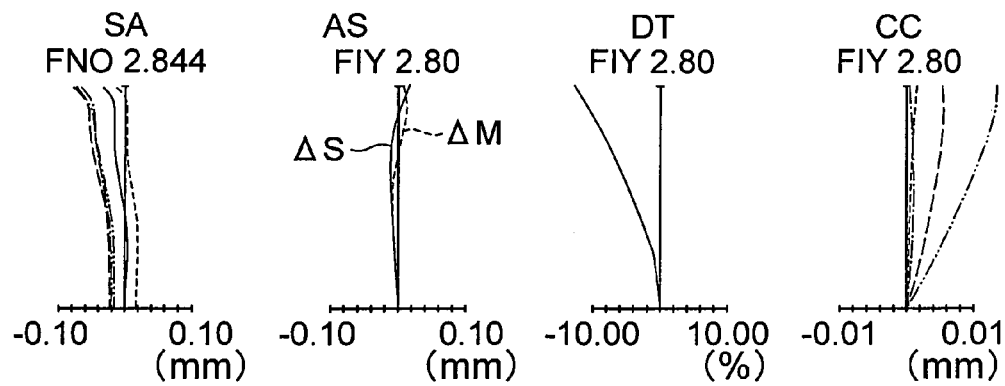
FIG. 10A, FIG. 10B, and FIG. 10C are diagrams showing a spherical aberration, an astigmatism, a distortion, and a chromatic aberration of magnification at the time of infinite object point focusing of the zoom lens system according to the fifth embodiment, where.
Figure 10B:
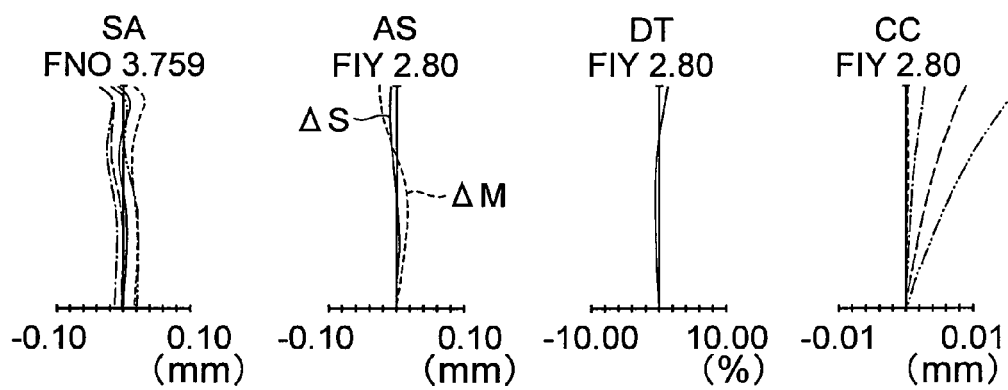
Figure 10C:
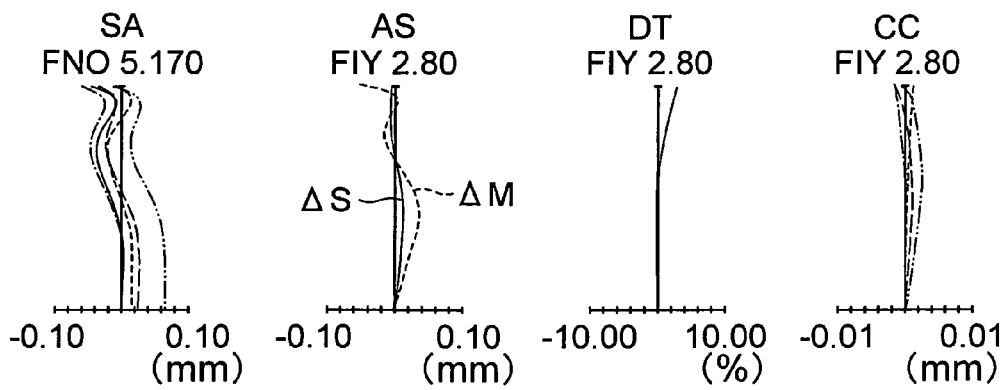

FIG. 10A, FIG. 10B, and FIG. 10C are diagrams showing a spherical aberration, an astigmatism, a distortion, and a chromatic aberration of magnification at the time of infinite object point focusing of the zoom lens system according to the fifth embodiment, where, FIG. 10A shows a state at the wide angle end, FIG. 10B shows an intermediate focal length state, and FIG. 10C shows a state at the telephoto end.

The zoom lens system of the fifth embodiment, as shown in FIG. 9A, FIG. 9B, and FIG. 9C, includes in order from an object side, a first lens group G1 having a negative refracting power, an aperture stop S, a second lens group G2 having a positive refracting power, a third lens group G3 having a positive refracting power, and a fourth lens group G4 having a negative refracting power.

The first lens group G1, includes in order from the object side, a cemented lens of a biconcave negative lens L1 and a positive meniscus lens L2 having a convex surface directed toward the object side, and has a negative refracting power as a whole.

The second lens group G2, includes in order from the object side, a biconvex positive lens L3, and a cemented lens of a positive meniscus lens L4 having a concave surface directed toward an image side and a negative meniscus lens L5 having a concave surface directed toward the image side, and has a positive refracting power as a whole.

The third lens group G3 includes a positive meniscus lens L6 having a convex surface directed toward the image side, and has a positive refracting power as a whole.

The fourth lens group G4 includes a negative meniscus lens L7 having a convex surface directed toward the object side, and has a negative refracting power as a whole.

At the time of zooming from the wide angle end to the telephoto end, the first lens group G1, after moving toward the image side, moves toward the object side. The second lens group G2 moves toward the object side. The third lens group G3 moves toward the image side. Fourth lens group G4 is fixed.

An aspheric surface is provided to six surfaces namely, a surface on the object side of the biconcave negative lens L1 and a surface on the image side of the positive meniscus lens L2 in the first lens group G1, both surfaces of the biconvex positive lens L3 in the second lens group G2, a surface on the image side of the positive meniscus lens L6 in the third lens group G3, and a surface on the object side of the negative meniscus lens L7 in the fourth lens group G4.

Figure 11A:
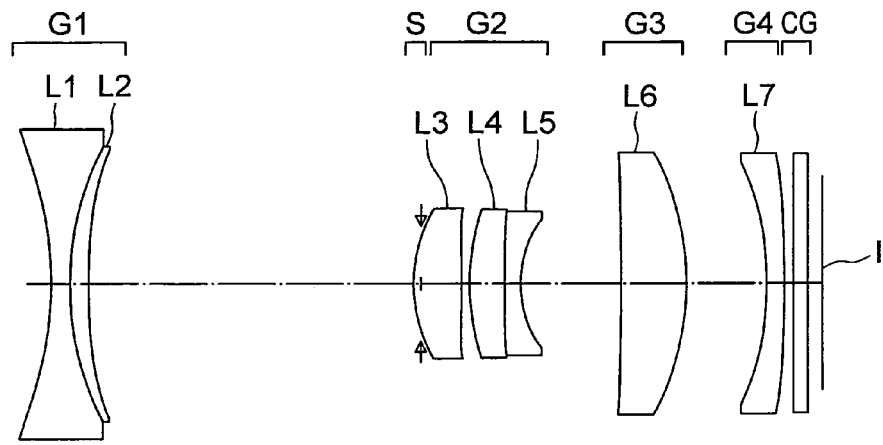
FIG. 11A, FIG. 11B, and FIG. 11C are lens cross-sectional views at the time of infinite object point focusing of a zoom lens system according to a sixth embodiment of the present invention, where.
Figure 11B:
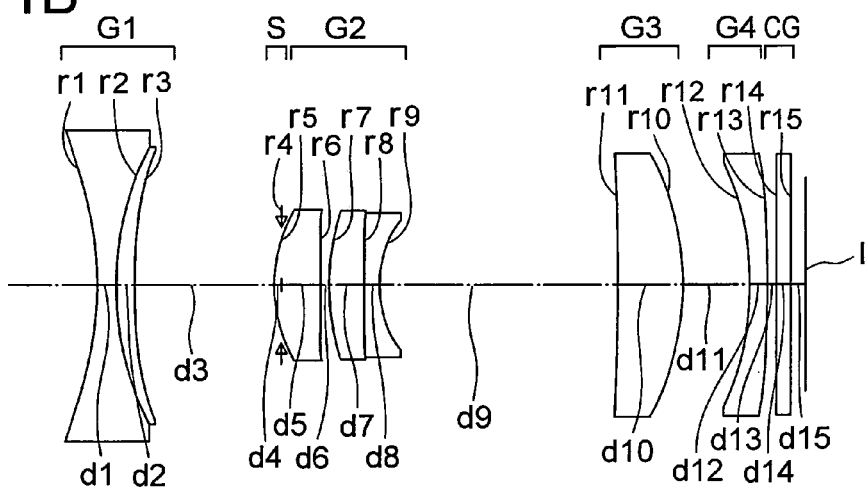
Figure 11C:
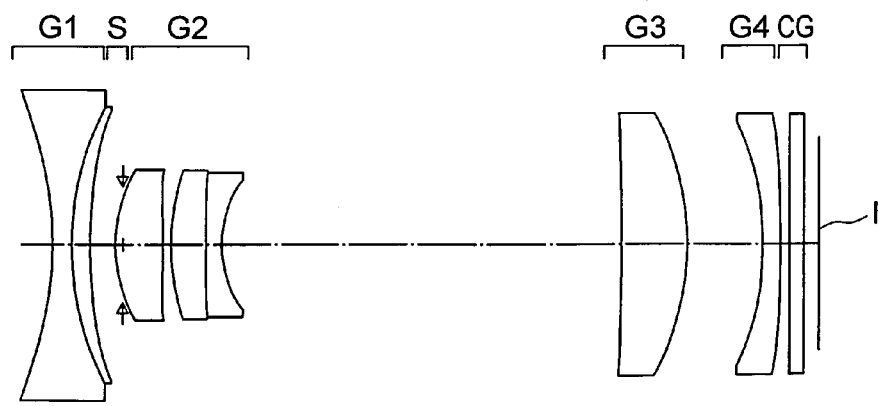

Next, a zoom lens system according to a sixth embodiment of the present invention will be described below. FIG. 11A, FIG. 11B, and FIG. 11C are lens cross-sectional views taken along an optical axis showing an optical arrangement at the time of infinite object point focusing of the zoom lens system according to the sixth embodiment, where, FIG. 11A shows a state at the wide angle end, FIG. 11B shows an intermediate focal length state, and FIG. 11C shows a state at the telephoto end.

Figure 12A:
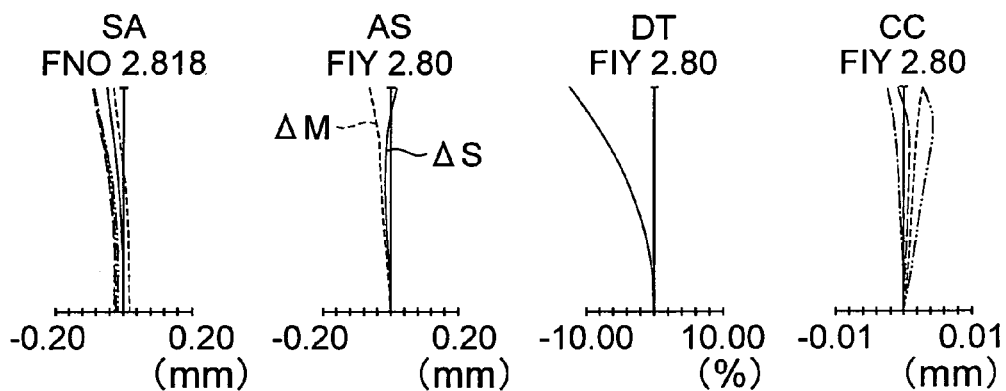
FIG. 12A, FIG. 12B, and FIG. 12C are diagrams showing a spherical aberration, an astigmatism, a distortion, and a chromatic aberration of magnification at the time of infinite object point focusing of the zoom lens system according to the sixth embodiment, where.
Figure 12B:
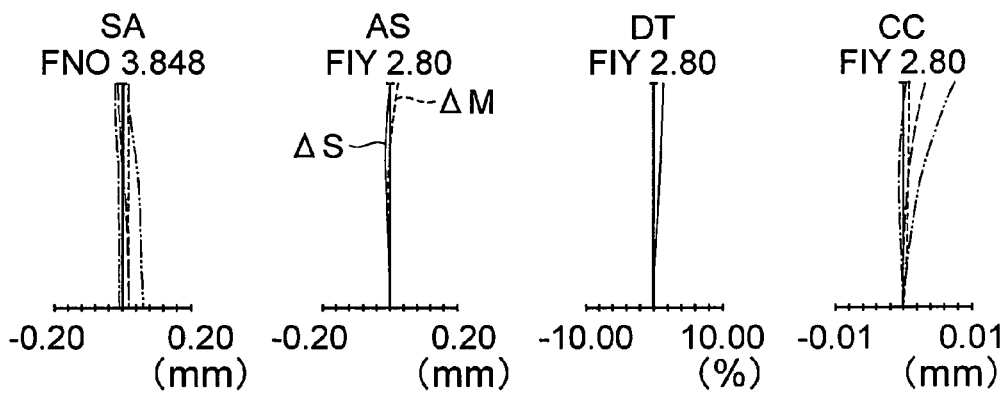
Figure 12C:
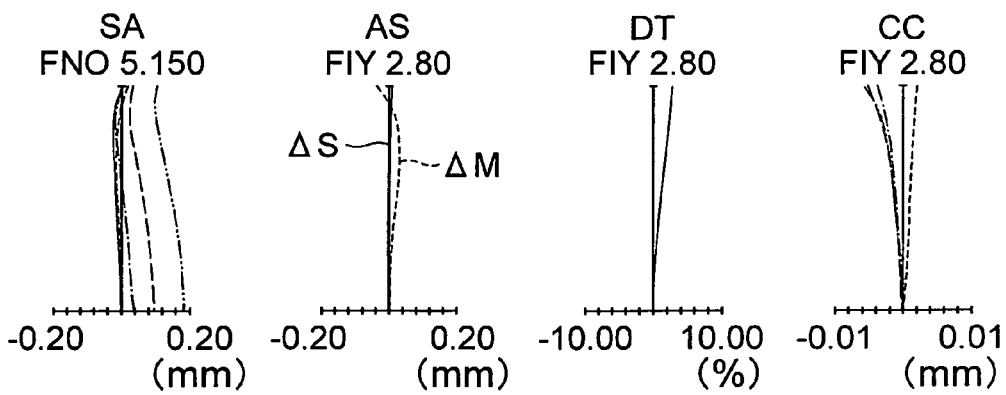

FIG. 12A, FIG. 12B, and FIG. 12C are diagrams showing a spherical aberration, an astigmatism, a distortion, and a chromatic aberration of magnification at the time of infinite object point focusing of the zoom lens system according to the sixth embodiment, where, FIG. 12A shows a state at the wide angle end, FIG. 12B shows an intermediate focal length state, and FIG. 12C shows a state at the telephoto end.

The zoom lens system of the sixth embodiment, as shown in FIG. 11A, FIG. 11B, and FIG. 11C, includes in order from an object side, a first lens group G1 having a negative refracting power, an aperture stop S, a second lens group G2 having a positive refracting power, a third lens group G3 having a positive refracting power, and a fourth lens group G4 having a negative refracting power.

The first lens group G1, included in order from the object side, a cemented lens of a biconcave negative lens L1 and a positive meniscus lens L2 having a convex surface directed toward the object side, and has a negative refracting power as a whole.

The second lens group G2, includes in order from the object side, a biconvex positive lens L3, and a cemented lens of a positive meniscus lens L4 having a concave surface directed toward the image side and a negative meniscus lens L5 having a concave surface directed toward the image side, and has a positive refracting power as a whole.

The third lens group G3 includes a positive meniscus lens L6 having a convex surface directed toward the image side, and has a positive refracting power as a whole.

The fourth lens group G4 includes a negative meniscus lens L7 having a convex surface directed toward the image side, and has a negative refracting power as a whole.

At the time of zooming from the wide angle end to the telephoto end, the first lens group G1, after moving toward the image side, moves toward the object side. The second lens group G2 moves toward the object side. The third lens group G3 moves toward the image side. The fourth lens group G4 is fixed.

An aspheric surface is provided to six surfaces namely, a surface on the object side of the biconcave negative lens L1 and a surface on the image side of the positive meniscus lens L2 in the first lens group G1, both surfaces of the biconvex positive lens L3 in the second lens group G2, a surface on the image side of the positive meniscus lens L6 in the third lens group G3, and a surface on the object side of the negative meniscus lens L7 in the fourth lens group G4.

Numerical data of each embodiment described above is shown below. Each of r1, r2, . . . denotes radius of curvature of each lens surface, each of d1, d2, . . . denotes a lens thickness or an air distance between two lenses, each of nd1, nd2, . . . denotes a refractive index of each lens for a d-line, and each of vd1, σd2, . . . denotes an Abbe's number for each lens. Further, $F_{NO}$ denotes an F number, f denotes a focal length of the entire zoom lens system, D0 denotes a distance from the object to the first surface of the lens system, and * denotes an aspheric data.

When z is let to be an optical axis with a direction of traveling of light as a positive direction, and y is let to be in a direction orthogonal to the optical axis, a shape of the aspheric surface is described by the following expression (I).

$$z=(y^2/r)/[1+\{1-(K+1)(y/r)^2\}^{1/2}]+A_4y^4+A_6y^6+A_8y^8+A_{10}y^{10} \quad (I)$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'E-n' (where, n is an integral number) indicates '$10^{-n}$'.

Numerical Example 1

| | | unit mm | | | |
|---|---|---|---|---|---|
| | | Surface data | | | |
| Surface no. | r | d | nd | vd | Effective radius |
| Object plane | ∞ | ∞ | | | |
| 1* | 8.5026 | 0.6000 | 1.53071 | 55.69 | 2.694 |
| 2* | 2.1971 | 0.5000 | 1.63387 | 23.38 | 2.045 |
| 3* | 2.5878 | Variable | | | 2.000 |

-continued

| unit mm | | | | | |
|---|---|---|---|---|---|
| 4(stop) | ∞ | −0.0989 | | | 0.852 |
| 5* | 1.5161 | 0.5000 | 1.53071 | 55.69 | 0.869 |
| 6 | 3.2620 | 0.1000 | 1.63387 | 23.38 | 0.859 |
| 7* | 1.4924 | 0.5282 | | | 0.850 |
| 8* | 3.1393 | 0.7000 | 1.53071 | 55.69 | 1.101 |
| 9 | −6.2747 | Variable | | | 1.202 |
| 10 | −5.2682 | 1.0000 | 1.53071 | 55.69 | 1.364 |
| 11* | −2.1837 | Variable | | | 1.537 |
| 12* | −2.5564 | 0.4000 | 1.53071 | 55.69 | 1.689 |
| 13 | 1590.4624 | 0.2000 | | | 1.916 |
| 14 | ∞ | 0.4000 | 1.51633 | 64.14 | 1.993 |
| 15 | ∞ | Variable | | | 2.092 |
| Image plane | ∞ | | | | |

Aspherical surface data

1st surface

K = 4.0028
A2 = 0.0000E+00, A4 = −1.1370E−02, A6 = 5.5851E−04, A8 = −6.0457E−06,
A10 = 0.0000E+00

2nd surface

K = −0.1905
A2 = 0.0000E+00, A4 = 1.3525E−02, A6 = −1.1424E−02, A8 = 1.1420E−03,
A10 = 0.0000E+00

3rd surface

K = −0.0960
A2 = 0.0000E+00, A4 = −1.9989E−02, A6 = −1.3814E−03, A8 = 2.5507E−04,
A10 = 0.0000E+00

5th surface

K = −2.9771
A2 = 0.0000E+00, A4 = 4.3512E−02, A6 = −1.6218E−02, A8 = 0.0000E+00,
A10 = 0.0000E+00

7th surface

K = 0.
A2 = 0.0000E+00, A4 = −8.4636E−02, A6 = 1.1205E−02, A8 = −1.9411E−02,
A10 = 0.0000E+00

8th surface

K = −0.2959
A2 = 0.0000E+00, A4 = −2.4094E−02, A6 = −4.7430E−04, A8 = −1.8561E−03,
A10 = 0.0000E+00

11th surface

K = −2.2427
A2 = 0.0000E+00, A4 = −7.8393E−03, A6 = 5.2420E−04, A8 = −4.2770E−05,
A10 = 0.0000E+00

12th surface

K = −1.5737

Zoom data

| | Wide angle | Intermediate | Telephoto |
|---|---|---|---|
| Focal length | 3.21529 | 5.21096 | 8.49737 |
| Fno. | 2.8000 | 3.5710 | 4.9593 |
| 2ω(°) | 77.0° | 46.4° | 29.1° |
| Image height | 2.250 | 2.250 | 2.250 |
| Lens total length | 12.5027 | 11.6539 | 12.2010 |
| BF | 0.31811 | 0.31815 | 0.31765 |
| d3 | 4.55940 | 1.95683 | 0.50075 |
| d9 | 0.69384 | 2.86599 | 5.75829 |
| d11 | 2.10201 | 1.68368 | 0.79505 |
| d15 | 0.31811 | 0.31815 | 0.31765 |

Zoom lens group data

| Group | Initial surface | focal length |
|---|---|---|
| 1 | 1 | −8.15531 |
| 2 | 4 | 4.48702 |
| 3 | 10 | 6.31766 |
| 4 | 12 | −4.80880 |

-continued unit mm

| Table of refractive index of glass material | List of refractive index for each wavelength of medium used in the present example | | | | |
|---|---|---|---|---|---|
| GLA | 587.56 | 656.27 | 486.13 | 435.83 | 404.66 |
| L2, L4 | 1.633870 | 1.626381 | 1.653490 | 1.671610 | 1.688826 |
| L1, L3, L5, L6, L7 | 1.530710 | 1.527870 | 1.537400 | 1.542740 | 1.547272 |
| L8 | 1.516330 | 1.513855 | 1.521905 | 1.526214 | 1.529768 |

Numerical Example 2 unit mm

Surface data

| Surface no. | r | d | nd | vd | Effective radius |
|---|---|---|---|---|---|
| Object plane | ∞ | ∞ | | | |
| 1* | 11.9285 | 0.6000 | 1.48749 | 70.23 | 2.603 |
| 2* | 2.1229 | 0.4000 | 1.63387 | 23.38 | 1.949 |
| 3* | 2.4985 | Variable | | | 1.900 |
| 4(stop) | ∞ | −0.1006 | | | 0.852 |
| 5* | 1.4744 | 0.5000 | 1.53071 | 55.69 | 0.864 |
| 6 | 3.6242 | 0.1000 | 1.63387 | 23.38 | 0.822 |
| 7* | 1.4702 | 0.5211 | | | 0.800 |
| 8* | 2.9167 | 0.7000 | 1.53071 | 55.69 | 0.900 |
| 9 | −6.9978 | Variable | | | 1.026 |
| 10 | −5.5014 | 0.9000 | 1.53071 | 55.69 | 1.219 |
| 11* | −2.2031 | Variable | | | 1.391 |
| 12* | −2.5245 | 0.4000 | 1.53071 | 55.69 | 1.657 |
| 13 | 2898.4750 | 0.2000 | | | 1.907 |
| 14 | ∞ | 0.4000 | 1.51633 | 64.14 | 1.996 |
| 15 | ∞ | Variable | | | 2.107 |
| Image plane | ∞ | | | | |

Aspherical surface data

1st surface

K = 4.0067
A2 = 0.0000E+00, A4 = −1.0996E−02, A6 = 7.9874E−04, A8 = −9.6596E−06,
A10 = 0.0000E+00

2nd surface

K = −0.2340
A2 = 0.0000E+00, A4 = −1.0294E−03, A6 = −9.1702E−03, A8 = 1.2784E−03,
A10 = 0.0000E+00

3rd surface

K = −0.0900
A2 = 0.0000E+00, A4 = −2.1661E−02, A6 = −1.7442E−03, A8 = 4.6140E−04,
A10 = 0.0000E+00

5th surface

K = −2.8754
A2 = 0.0000E+00, A4 = 3.6798E−02, A6 = −1.3732E−02, A8 = 0.0000E+00,
A10 = 0.0000E+00

7th surface

K = 0.
A2 = 0.0000E+00, A4 = −1.0439E−01, A6 = 1.5871E−02, A8 = −2.0184E−02,
A10 = 0.0000E+00

8th surface

K = −0.3013
A2 = 0.0000E+00, A4 = −3.0387E−02, A6 = −2.0499E−03, A8 = −1.4035E−03,
A10 = 0.0000E+00

-continued unit mm

11th surface

K = −2.3743
A2 = 0.0000E+00, A4 = −8.1979E−03, A6 = 7.4444E−04, A8 = −6.2238E−05,
A10 = 0.0000E+00

12th surface

K = −1.7555

Zoom data

|  | Wide angle | Intermediate | Telephoto |
|---|---|---|---|
| Focal length | 3.21310 | 5.21317 | 8.49616 |
| Fno. | 2.8000 | 3.6183 | 5.0500 |
| 2ω(°) | 77.0° | 46.4° | 29.1° |
| Image height | 2.250 | 2.250 | 2.250 |
| Lens total length | 11.8029 | 11.4187 | 12.2426 |
| BF | 0.31857 | 0.31856 | 0.31823 |
| d3 | 4.06134 | 1.79429 | 0.49852 |
| d9 | 0.69508 | 3.01778 | 6.01020 |
| d11 | 2.10742 | 1.66759 | 0.79513 |
| d15 | 0.31857 | 0.31856 | 0.31823 |

Zoom lens group data

| Group | Initial surface | focal length |
|---|---|---|
| 1 | 1 | −7.45825 |
| 2 | 4 | 4.37990 |
| 3 | 10 | 6.32574 |
| 4 | 12 | −4.75242 |

| Table of refractive index of glass material | List of refractive index for each wavelength of medium used in the present example | | | | |
|---|---|---|---|---|---|
| GLA | 587.56 | 656.27 | 486.13 | 435.83 | 404.66 |
| L2, L4 | 1.633870 | 1.626381 | 1.653490 | 1.671610 | 1.688826 |
| L3, L5, L6, L7 | 1.530710 | 1.527870 | 1.537400 | 1.542740 | 1.547272 |
| L8 | 1.516330 | 1.513855 | 1.521905 | 1.526214 | 1.529768 |
| L1 | 1.487490 | 1.485344 | 1.492285 | 1.495964 | 1.498983 |

Numerical Example 3 unit mm

Surface data

| Surface no. | r | d | nd | vd | Effective radius |
|---|---|---|---|---|---|
| Object plane | ∞ | ∞ | | | |
| 1* | 11.0778 | 0.6000 | 1.48749 | 70.23 | 2.484 |
| 2* | 2.0762 | 0.4000 | 1.63387 | 23.38 | 1.859 |
| 3* | 2.4441 | Variable | | | 1.800 |
| 4(stop) | ∞ | −0.1007 | | | 0.876 |
| 5* | 1.4617 | 0.5000 | 1.53071 | 55.69 | 0.889 |
| 6 | 4.0227 | 0.1000 | 1.63387 | 23.38 | 0.852 |
| 7* | 1.4488 | 0.4458 | | | 0.831 |
| 8* | 3.7770 | 0.7000 | 1.74320 | 49.34 | 0.900 |
| 9 | −11.6433 | Variable | | | 1.025 |
| 10 | −6.3244 | 0.9000 | 1.53071 | 55.69 | 1.227 |
| 11* | −2.2852 | Variable | | | 1.399 |
| 12* | −2.9817 | 0.4000 | 1.53071 | 55.69 | 1.695 |
| 13 | 4387.4018 | 0.2000 | | | 1.922 |
| 14 | ∞ | 0.4000 | 1.51633 | 64.14 | 2.007 |
| 15 | ∞ | Variable | | | 2.114 |
| Image plane | ∞ | | | | |

-continued unit mm

Aspherical surface data

1st surface

K = 4.0063
A2 = 0.0000E+00, A4 = −1.1576E−02, A6 = 8.3869E−04, A8 = −7.0337E−06,
A10 = 0.0000E+00
2nd surface K = −0.2695
A2 = 0.0000E+00, A4 = 2.7897E−04, A6 = −1.0745E−02, A8 = 1.6887E−03,
A10 = 0.0000E+00
3rd surface K = −0.0896
A2 = 0.0000E+00, A4 = −2.2372E−02, A6 = −2.3166E−03, A8 = 6.3363E−04,
A10 = 0.0000E+00
5th surface K = −2.7639
A2 = 0.0000E+00, A4 = 3.4158E−02, A6 = −1.4938E−02, A8 = 0.0000E+00,
A10 = 0.0000E+00
7th surface K = 0.
A2 = 0.0000E+00, A4 = −1.0725E−01, A6 = 8.8637E−03, A8 = −2.3989E−02,
A10 = 0.0000E+00
8th surface K = −0.2757
A2 = 0.0000E+00, A4 = −2.0655E−02, A6 = −2.8481E−03, A8 = −4.9408E−03,
A10 = 0.0000E+00
11th surface K = −2.4884
A2 = 0.0000E+00, A4 = −7.9658E−03, A6 = 6.7559E−04, A8 = −5.4115E−05,
A10 = 0.0000E+00
12th surface

K = −1.7439

Zoom data

|  | Wide angle | Intermediate | Telephoto |
| --- | --- | --- | --- |
| Focal length | 3.21274 | 5.21545 | 8.49566 |
| Fno. | 2.6664 | 3.4954 | 4.9000 |
| 2ω(°) | 77.0° | 46.2° | 29.1° |
| Image height | 2.250 | 2.250 | 2.250 |
| Lens total length | 11.5026 | 11.4095 | 12.3754 |
| BF | 0.31840 | 0.31819 | 0.31743 |
| d3 | 3.84488 | 1.74737 | 0.49850 |
| d9 | 0.69533 | 3.16771 | 6.21872 |
| d11 | 2.09893 | 1.63108 | 0.79564 |
| d15 | 0.31840 | 0.31819 | 0.31743 |

Zoom lens group data

| Group | Initial surface | focal length |
| --- | --- | --- |
| 1 | 1 | −7.44648 |
| 2 | 4 | 4.38301 |
| 3 | 10 | 6.25840 |
| 4 | 12 | −5.61437 |

| Table of refractive index of glass material | List of refractive index for each wavelength of medium used in the present example | | | | |
| --- | --- | --- | --- | --- | --- |
| GLA | 587.56 | 656.27 | 486.13 | 435.83 | 404.66 |
| L2, L4 | 1.633870 | 1.626381 | 1.653490 | 1.671610 | 1.688826 |
| L3, L6, L7 | 1.530710 | 1.527870 | 1.537400 | 1.542740 | 1.547272 |
| L8 | 1.516330 | 1.513855 | 1.521905 | 1.526214 | 1.529768 |
| L1 | 1.487490 | 1.485344 | 1.492285 | 1.495964 | 1.498983 |
| L5 | 1.743198 | 1.738653 | 1.753716 | 1.762047 | 1.769040 |

Numerical Example 4

| | | unit mm | | | |
|---|---|---|---|---|---|
| | | Surface data | | | |
| Surface no. | r | d | nd | νd | Effective radius |
| Object plane | ∞ | ∞ | | | |
| 1* | 13.6772 | 0.6000 | 1.53071 | 55.69 | 2.715 |
| 2* | 2.6296 | 0.5000 | 1.63387 | 23.38 | 2.095 |
| 3* | 3.0916 | Variable | | | 2.000 |
| 4(stop) | ∞ | −0.0962 | | | 0.852 |
| 5* | 2.4133 | 0.6892 | 1.63259 | 23.27 | 0.844 |
| 6* | 1.2886 | 0.2054 | | | 0.891 |
| 7* | 1.8724 | 0.8301 | 1.53071 | 55.69 | 0.977 |
| 8* | −3.6942 | Variable | | | 1.110 |
| 9 | −6.5652 | 1.0000 | 1.53071 | 55.69 | 1.299 |
| 10* | −2.3968 | Variable | | | 1.469 |
| 11* | −2.5139 | 0.4000 | 1.53071 | 55.69 | 1.673 |
| 12 | 1943.1013 | 0.2000 | | | 1.899 |
| 13 | ∞ | 0.4000 | 1.51633 | 64.14 | 1.978 |
| 14 | ∞ | Variable | | | 2.083 |
| Image plane | ∞ | | | | |

Aspherical surface data

1st surface

K = 4.0072
A2 = 0.0000E+00, A4 = −8.4176E−03, A6 = 6.0152E−04, A8 = −9.5239E−06,
A10 = 0.0000E+00
2nd surface K = −0.2123
A2 = 0.0000E+00, A4 = 5.9345E−03, A6 = −6.9656E−03, A8 = 8.9529E−04,
A10 = 0.0000E+00
3rd surface K = −0.0963
A2 = 0.0000E+00, A4 = −1.5661E−02, A6 = −6.1079E−04, A8 = 2.5551E−04,
A10 = 0.0000E+00
5th surface K = −3.0798
A2 = 0.0000E+00, A4 = −5.8494E−02, A6 = −1.3279E−03, A8 = 0.0000E+00,
A10 = 0.0000E+00
6th surface K = 0.
A2 = 0.0000E+00, A4 = −2.0496E−01, A6 = −4.6932E−03, A8 = −3.5456E−02,
A10 = 0.0000E+00
7th surface K = −0.3207
A2 = 0.0000E+00, A4 = −5.2269E−02, A6 = 1.9460E−02, A8 = −4.1231E−02,
A10 = 0.0000E+00
8th surface K = −0.0871
A2 = 0.0000E+00, A4 = 7.0844E−03, A6 = 3.6181E−02, A8 = −2.3660E−02,
A10 = 0.0000E+00
10th surface K = −2.4635*
A2 = 0.0000E+00, A4 = −4.7892E−03, A6 = 1.7045E−04, A8 = −9.9897E−06,
A10 = 0.0000E+00
11th surface

K = −1.8390

| | Zoom data | | |
|---|---|---|---|
| | Wide angle | Intermediate | Telephoto |
| Focal length | 3.20817 | 5.20791 | 8.49756 |
| Fno. | 2.8000 | 3.5710 | 4.9593 |
| 2ω(°) | 77.2° | 46.6° | 29.1° |

-continued

| unit mm | | | |
|---|---|---|---|
| Image height | 2.250 | 2.250 | 2.250 |
| Lens total length | 12.5013 | 12.1303 | 12.7263 |
| BF | 0.31908 | 0.31892 | 0.31949 |
| d3 | 4.40441 | 1.99042 | 0.49719 |
| d8 | 0.70238 | 3.32890 | 6.38409 |
| d10 | 2.34699 | 1.76365 | 0.79712 |
| d14 | 0.31908 | 0.31892 | 0.31949 |

| Zoom lens group data | | |
|---|---|---|
| Group | Initial surface | focal length |
| 1 | 1 | −8.36013 |
| 2 | 4 | 4.67639 |
| 3 | 9 | 6.56688 |
| 4 | 11 | −4.73050 |

| Table of refractive index of glass material | List of refractive index for each wavelength of medium used in the present example | | | | |
|---|---|---|---|---|---|
| GLA | 587.56 | 656.27 | 486.13 | 435.83 | 404.66 |
| L2 | 1.633870 | 1.626381 | 1.653490 | 1.671610 | 1.688826 |
| L1, L4, L5, L6 | 1.530710 | 1.527870 | 1.537400 | 1.542740 | 1.547272 |
| L3 | 1.632590 | 1.624940 | 1.652120 | 1.669410 | 1.685501 |
| L7 | 1.516330 | 1.513855 | 1.521905 | 1.526214 | 1.529768 |

Numerical Example 5

| unit mm | | | | | |
|---|---|---|---|---|---|
| Surface data | | | | | |
| Surface no. | r | d | nd | vd | Effective radius |
| Object plane | ∞ | ∞ | | | |
| 1* | −8.7248 | 0.5100 | 1.58313 | 59.38 | 3.555 |
| 2 | 11.5405 | 0.7000 | 2.10223 | 16.77 | 3.221 |
| 3* | 19.0000 | Variable | | | 3.100 |
| 4(stop) | ∞ | −0.2000 | | | 1.490 |
| 5* | 5.5575 | 1.2500 | 1.76802 | 49.24 | 1.591 |
| 6* | −8.8354 | 0.2000 | | | 1.565 |
| 7 | 6.8330 | 0.9000 | 1.88300 | 40.76 | 1.559 |
| 8 | 100.0000 | 0.4000 | 1.84666 | 23.78 | 1.489 |
| 9 | 2.8989 | Variable | | | 1.300 |
| 10 | −116.1817 | 1.7000 | 1.81474 | 37.03 | 2.800 |
| 11* | −7.2698 | Variable | | | 3.033 |
| 12* | −8.5000 | 0.5000 | 1.52542 | 55.78 | 3.000 |
| 13 | −25.0000 | 0.2000 | | | 3.000 |
| 14 | ∞ | 0.4000 | 1.51633 | 64.14 | 2.796 |
| 15 | ∞ | Variable | | | 2.820 |
| Image plane | ∞ | | | | |

| Aspherical surface data |
|---|
| 1st surface |

$K = -2.7964$
$A2 = 0.0000E+00$, $A4 = 4.9527E-04$, $A6 = -1.2914E-05$, $A8 = 2.0317E-07$,
$A10 = 0.0000E+00$

3rd surface $K = -2.1642$
$A2 = 0.0000E+00$, $A4 = 3.5782E-04$, $A6 = 3.4794E-06$, $A8 = -3.6399E-08$,
$A10 = 0.0000E+00$ 5th surface $K = -0.1501$
$A2 = 0.0000E+00$, $A4 = -5.4199E-03$, $A6 = -1.9877E-04$, $A8 = -2.6909E-04$,
$A10 = 0.0000E+00$ -continued unit mm 6th surface K = 0.3537
A2 = 0.0000E+00, A4 = −3.7764E−03, A6 = −3.1581E−04, A8 = −1.7462E−04,
A10 = 0.0000E+00

11th surface

K = 3.0398
A2 = 0.0000E+00, A4 = 2.8242E−03, A6 = −2.6491E−04, A8 = 2.1346E−05,
A10 = 0.0000E+00

12th surface

K = 0.
A2 = 0.0000E+00, A4 = 7.5456E−03, A6 = −1.7255E−03, A8 = 8.6189E−05,
A10 = 0.0000E+00

Zoom data

|  | Wideangle | Intermediate | Telephoto |
|---|---|---|---|
| Focal length | 5.01624 | 8.40472 | 14.09420 |
| Fno. | 2.8438 | 3.7587 | 5.1698 |
| 2ω(°) | 65.0° | 36.4° | 21.8° |
| Image height | 2.800 | 2.800 | 2.800 |
| Lens total length | 19.9454 | 18.3063 | 19.6102 |
| BF | 0.38444 | 0.38807 | 0.39522 |
| d3 | 8.22258 | 3.78587 | 0.80000 |
| d9 | 2.60434 | 5.76071 | 10.16598 |
| d11 | 2.17407 | 1.81161 | 1.68900 |
| d13 | 0.20000 | 0.20000 | 0.20000 |
| d15 | 0.38444 | 0.38807 | 0.39522 |

Zoom lens group data

| Group | Initial surface | focal length |
|---|---|---|
| 1 | 1 | −12.41453 |
| 2 | 4 | 6.99570 |
| 3 | 10 | 9.45225 |
| 4 | 12 | −24.76996 |

| Table of refractive index of glass material | List of refractive index for each wavelength of medium used in the present example | | | | |
|---|---|---|---|---|---|
| GLA | 587.56 | 656.27 | 486.13 | 435.84 | 404.66 |
| L2 | 002.102230 | 2.084080 | 2.149790 | 2.193956 | 2.236910 |
| L6 | 1.814740 | 1.808250 | 1.830250 | 1.843045 | 1.854169 |
| L3 | 1.768020 | 1.763310 | 1.778910 | 1.787509 | 1.794710 |
| L1 | 1.583126 | 1.580139 | 1.589960 | 1.595296 | 1.599721 |
| L8 | 1.516330 | 1.513855 | 1.521905 | 1.526213 | 1.529768 |
| L4 | 1.882997 | 1.876560 | 1.898221 | 1.910495 | 1.920919 |
| L5 | 1.846660 | 1.836488 | 1.872096 | 1.894186 | 1.914294 |
| L7 | 1.525420 | 1.522680 | 1.532100 | 1.537050 | 1.540699 |

Numerical Example 6 unit mm

Surface data

| Surface no. | r | d | nd | vd | Effective radius |
|---|---|---|---|---|---|
| Object plane | ∞ | ∞ | | | |
| 1* | −9.3178 | 0.5100 | 1.48749 | 70.23 | 3.720 |
| 2 | 8.3000 | 0.4693 | 1.63494 | 23.22 | 3.254 |
| 3* | 14.2906 | Variable | | | 3.200 |
| 4(stop) | ∞ | −0.2000 | | | 1.520 |
| 5* | 4.1436 | 1.2500 | 1.76802 | 49.24 | 1.591 |
| 6* | −33.5907 | 0.2000 | | | 1.565 |
| 7 | 6.4435 | 0.9000 | 1.88300 | 40.76 | 1.559 |

-continued

| | | unit mm | | | |
|---|---|---|---|---|---|
| 8 | 55.9101 | 0.4000 | 1.84666 | 23.78 | 1.489 |
| 9 | 2.9099 | Variable | | | 1.300 |
| 10 | −86.6892 | 1.7000 | 1.80610 | 40.92 | 3.000 |
| 11* | −6.8390 | Variable | | | 3.033 |
| 12* | −10.0000 | 0.5000 | 1.52542 | 55.78 | 2.800 |
| 13 | −26.0000 | 0.2000 | | | 3.000 |
| 14 | ∞ | 0.4000 | 1.51633 | 64.14 | 3.000 |
| 15 | ∞ | Variable | | | 3.000 |
| Image plane | ∞ | | | | |

Aspherical surface data

1st surface

K = −1.0096
A2 = 0.0000E+00, A4 = 0.0000E+00, A6 = 4.3950E−05, A8 = −9.9585E−07,
A10 = 0.0000E+00
3rd surface K = −1.8372
A2 = 0.0000E+00, A4 = −1.5697E−04, A6 = 5.5163E−05, A8 = 6.1396E−08,
A10 = 0.0000E+00
5th surface K = −2.3593
A2 = 0.0000E+00, A4 = 3.7665E−03, A6 = 1.8088E−04, A8 = 6.4600E−05,
A10 = 0.0000E+00
6th surface K = −15.7369
A2 = 0.0000E+00, A4 = 2.2973E−03, A6 = 3.5664E−04, A8 = 8.2212E−05,
A10 = 0.0000E+00
11th surface K = 0.
A2 = 0.0000E+00, A4 = 5.9653E−04, A6 = −1.1878E−05, A8 = 0.0000E+00,
A10 = 0.0000E+00
12th surface K = 0.
A2 = 0.0000E+00, A4 = −1.7882E−03, A6 = 3.1137E−05, A8 = 0.0000E+00,
A10 = 0.0000E+00

Zoom data

| | Wide angle | Intermediate | Telephoto |
|---|---|---|---|
| Focal length | 4.99998 | 8.78989 | 14.33392 |
| Fno. | 2.8179 | 3.8485 | 5.1499 |
| 2ω(°) | 65.2° | 34.8° | 21.4° |
| Image height | 2.800 | 2.800 | 2.800 |
| Lens total length | 20.0042 | 18.3461 | 19.8114 |
| BF | 0.38121 | 0.37995 | 0.37987 |
| d3 | 8.59361 | 3.79827 | 0.80000 |
| d9 | 2.60000 | 6.10474 | 10.32345 |
| d11 | 2.10000 | 1.73380 | 1.97877 |
| d13 | 0.20000 | 0.20000 | 0.20000 |
| d15 | 0.38121 | 0.37995 | 0.37987 |

Zoom lens group data

| Group | Initial surface | focal length |
|---|---|---|
| 1 | 1 | −12.51583 |
| 2 | 4 | 7.05598 |
| 3 | 10 | 9.12400 |
| 4 | 12 | −31.26416 |

| Table of refractive index of glass material | List of refractive index for each wavelength of medium used in the present example | | | | |
|---|---|---|---|---|---|
| | 587.56 | 656.27 | 486.13 | 435.84 | 404.66 |
| L3 | 1.768020 | 1.763310 | 1.778910 | 1.787509 | 1.794710 |
| L2 | 1.634940 | 1.627290 | 1.654640 | 1.672908 | 1.689875 |
| L8 | 1.516330 | 1.513855 | 1.521905 | 1.526213 | 1.529768 |
| L1 | 1.487490 | 1.485344 | 1.492285 | 1.495963 | 1.498983 |
| L6 | 1.806098 | 1.800248 | 1.819945 | 1.831173 | 1.840781 |

-continued

| | | | unit mm | | |
|---|---|---|---|---|---|
| L4 | 1.882997 | 1.876560 | 1.898221 | 1.910495 | 1.920919 |
| L5 | 1.846660 | 1.836488 | 1.872096 | 1.894186 | 1.914294 |
| L7 | 1.525420 | 1.522680 | 1.532100 | 1.537050 | 1.540699 |

Values of conditional expressions in each example are shown below:

| | Example 1 | Example 2 | Example 3 |
|---|---|---|---|
| fw (Wideangle end) | 3.215 | 3.213 | 3.213 |
| fs (Intermediate) | 5.211 | 5.213 | 5.215 |
| ft (Telephoto end) | 8.497 | 8.496 | 8.496 |
| Half angle of field (wide angle end) including DT | 38.5° | 38.5° | 38.5° |
| Half angle of field (intermediate) including DT | 23.2° | 23.2° | 23.1° |
| Half angle of field (telephoto end) including DT | 14.6° | 14.6° | 14.6° |
| γ (=ft/fw) | 2.643 | 2.644 | 2.644 |
| y10 | 2.25 | 2.25 | 2.25 |
| f4(=1/φ4) | −4.809 | −4.752 | −5.614 |
| fw/f4 | −0.6686 | −0.6761 | −0.5722 |
| β4w | 1.217 | 1.220 | 1.186 |
| D4iw/(Dw + Dt) | 0.03165 | 0.03253 | 0.03277 |
| n4 | 1.53071 | 1.53071 | 1.53071 |
| ν4 | 55.69 | 55.69 | 55.69 |
| a = (y10)2 × log10γ/fw | 0.6647 | 0.6653 | 0.6653 |
| hA = 3.0a | 1.9939 | 1.9960 | 1.9960 |
| hB = 2.5a | 1.6616 | 1.6633 | 1.6633 |
| hC = 2.5a | 1.6616 | 1.6633 | 1.6633 |
| zB (hB) | 0.42874 | 0.44901 | 0.45979 |
| zC (hC) | 0.65419 | 0.62708 | 0.64432 |
| \|zC (hC) − zB(hB)\|/tp | 0.45090 | 0.44518 | 0.46133 |
| ΔzC (hC) | −0.10541 | −0.17670 | −0.18928 |
| ΔzA (hA) | −0.13067 | −0.12134 | −0.12599 |
| ΔzB (hB) | −0.17518 | −0.18509 | −0.19348 |
| (ΔzA (hA) + ΔzB(hB))/2 | −0.15293 | −0.15322 | −0.15974 |
| [ΔzC (hC) − {ΔzA (hA) + ΔzB(hB)}/2]/fw | 0.04752 | −0.02348 | −0.02954 |
| (r11 + r13)/(r11 − r13) | 1.8750 | 1.5299 | 1.5662 |
| θgFp | 0.6684 | 0.6684 | 0.6684 |
| θgFn | 0.5603 | 0.5302 | 0.5302 |
| θhgp | 0.6351 | 0.6351 | 0.6351 |
| θhgn | 0.4756 | 0.4351 | 0.4351 |
| νdp − νdn | −32.31 | −46.85 | −46.85 |
| (θgFp − θgFn)/(νdp − νdn) | −3.346e−3 | −2.950e−3 | −2.950e−3 |
| (θhgp − θhgn)/(νdp − νdn) | −4.936e−3 | −4.269e−3 | −4.269e−3 |
| β234w | −0.3943 | −0.4308 | −0.4314 |
| f2 | 4.4863 | 4.3802 | 4.3821 |
| f2/fw | 1.3955 | 1.3631 | 1.3643 |
| Dw + Dt | 24.7037 | 24.0455 | 23.8780 |
| Dw − Dt | 0.3017 | −0.4397 | −0.8728 |
| (Dw − Dt)/(Dw + Dt) | 0.01221 | −0.01829 | −0.03655 |
| r23/r21 | 0.9844 | 0.9972 | 0.9912 |
| (r21 + r23)/r22 | 0.9223 | 0.8125 | 0.7235 |
| (r24 + r25)/(r24 − r25) | −0.3331 | −0.4116 | −0.5101 |
| r'25/r'23 | — | — | — |
| (r'23 + r'25)/r'24 | — | — | — |
| β34t/β34w | 1.3463 | 1.3527 | 1.3631 |
| fw/f34w | 0.01882 | 0.01876 | 0.10489 |
| f4/f3 | −0.7612 | −0.7513 | −0.8971 |
| r31/r25 | 0.8396 | 0.7862 | 0.5432 |
| r32/r41 | 0.8542 | 0.8727 | 0.7664 |

| | Example 4 | Example 5 | Example 6 |
|---|---|---|---|
| fw (Wideangle end) | 3.208 | 5.016 | 5.000 |
| fs (Intermediate) | 5.208 | 8.405 | 8.790 |
| ft (Telephoto end) | 8.498 | 14.094 | 14.334 |
| Half angle of field (wide angle end) including DT | 38.5° | 32.5° | 32.6° |
| Half angle of field (intermediate) including DT | 23.3° | 18.2° | 17.4° |
| Half angle of field (telephoto end) including DT | 14.6° | 10.9° | 10.7° |
| γ (=ft/fw) | 2.649 | 2.810 | 2.867 |
| y10 | 2.25 | 2.80 | 2.80 |
| f4 (=1/φ4) | −4.731 | −24.770 | −31.264 |
| fw/ | −0.6782 | −0.2025 | −0.1599 |
| β4w | 1.221 | 1.055 | 1.044 |

-continued

| | | | |
|---|---|---|---|
| D4iw/(Dw + Dt) | 0.03103 | 0.02144 | 0.02122 |
| n4 | 1.53071 | 1.52542 | 1.52542 |
| ν4 | 55.69 | 55.78 | 55.78 |
| a = (y10)2 × log10γ/fw | 0.6677 | 0.7013 | 0.7172 |
| hA = 3.0a | 2.0029 | 2.1039 | 2.1517 |
| hB = 2.5a | 1.6691 | 1.7532 | 1.7931 |
| hC = 2.5a | 1.6691 | 1.7532 | 1.7931 |
| zB (hB) | 0.36556 | 0.08417 | 0.11234 |
| zC (hC) | 0.52950 | 0.13395 | 0.19600 |
| \|zC (hC) − zB(hB)\|/tp | 0.32788 | 0.07111 | 0.17827 |
| ΔzC (hC) | −0.06813 | 0 | 0 |
| ΔzA (hA) | −0.09573 | 0.01876 | 0.00734 |
| ΔzB (hB) | −0.12371 | 0.00311 | −0.00060 |
| (ΔzA (hA) + ΔzB(hB))/2 | −0.10972 | 0.01094 | 0.00337 |
| [ΔzC (hC) − {ΔzA (hA) + ΔzB(hB)}/2]/fw | 0.04159 | −0.00218 | −0.00067 |
| (r11 + r13)/(r11 − r13) | 1.5841 | −0.3706 | −0.2106 |
| θgFp | 0.6684 | 0.6721 | 0.6679 |
| θgFn | 0.5603 | 0.5438 | 0.5302 |
| θhgp | 0.6351 | 0.6537 | 0.6203 |
| θhgn | 0.4756 | 0.4501 | 0.4351 |
| νdp − νdn | −32.31 | −42.61 | −47.01 |
| (θgFp − θgFn)/(νdp − νdn) | −3.346e−3 | −3.011e−3 | −2.929e−3 |
| (θhgp − θhgn)/(νdp − νdn) | −4.936e−3 | −4.7782e−3 | −3.940e−3 |
| β234w | −0.3837 | −0.4041 | −0.3995 |
| f2 | 4.6773 | 6.9957 | 7.0560 |
| f2/fw | 1.4577 | 1.3947 | 1.4112 |
| Dw + Dt | 25.2276 | 39.5556 | 39.8156 |
| Dw − Dt | −0.2250 | 0.3352 | 0.1928 |
| (Dw − Dt)/(Dw + Dt) | −0.00892 | 0.00847 | 0.00484 |
| r23/r21 | 0.7759 | — | — |
| (r21 + r23)/r22 | — | — | — |
| (r24 + r25)/(r24 − r25) | −0.3273 | — | — |
| r'25/r'23 | — | 0.4242 | 0.4516 |
| (r'23 + r'25)/r'24 | — | 0.0973 | 0.1673 |
| β34t/β34w | 1.4178 | 1.0767 | 1.0204 |
| fw/f34w | 0.01695 | 0.36976 | 0.41986 |
| f4/f3 | −0.7204 | −2.6205 | −3.4266 |
| r31/r25 | 1.7772 | — | — |
| r32/r41 | 0.9534 | — | — |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 13:
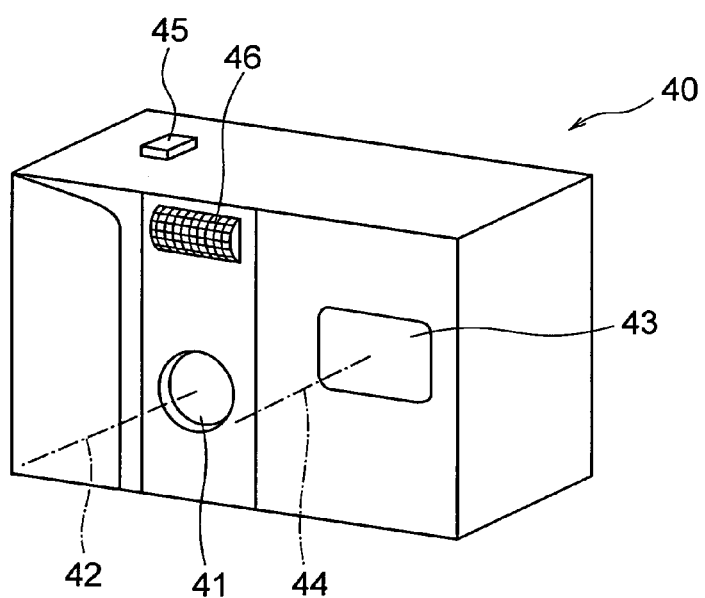
FIG. 13 is a front perspective view showing an appearance of a digital camera 40 in which, a zoom lens system according to the present invention is incorporated.
Figure 14:
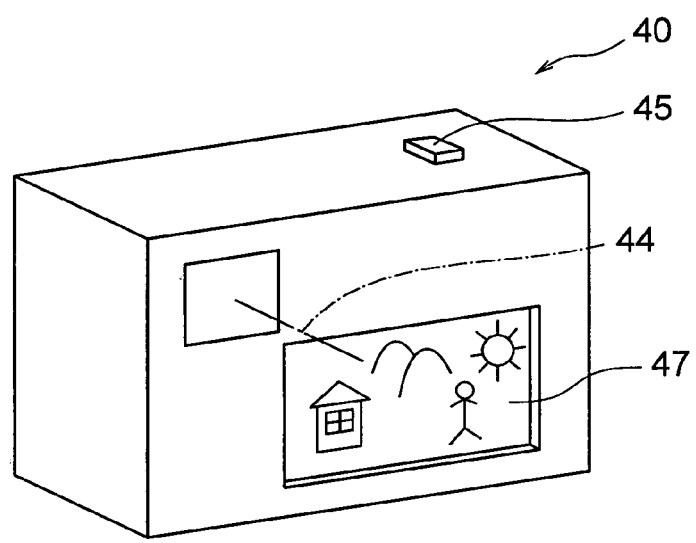
FIG. 14 is a rear perspective view of the digital camera 40.
Figure 15:
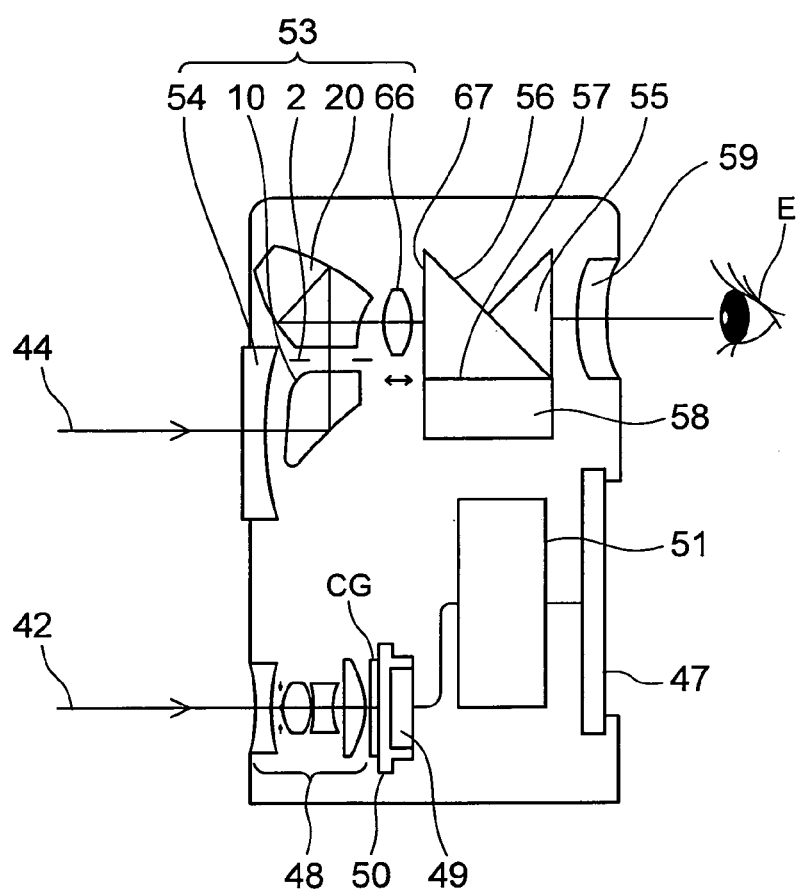
FIG. 15 is a cross-sectional view showing an optical arrangement of the digital camera 40.

In FIG. 13 to FIG. 15 show conceptual diagrams of structures in which the image forming optical system according to the present invention is incorporated in a photographic optical system 41 of a digital camera. FIG. 13 is a frontward perspective view showing an appearance of a digital camera 40, FIG. 14 is a rearward perspective view of the same, and FIG. 15 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 16:
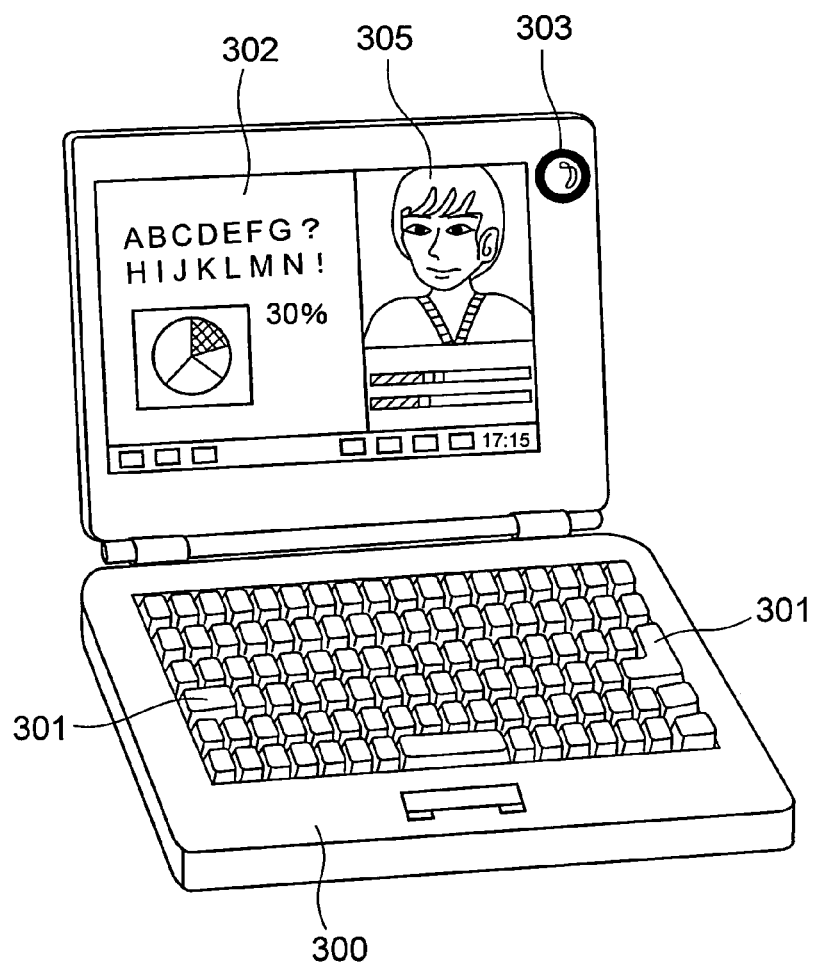
FIG. 16 is a front perspective view of a state in which a cover of a personal computer 300 which is an example of an information processing apparatus in which, a zoom optical system of the present invention is built-in as an objective optical system, is opened.
Figure 17:
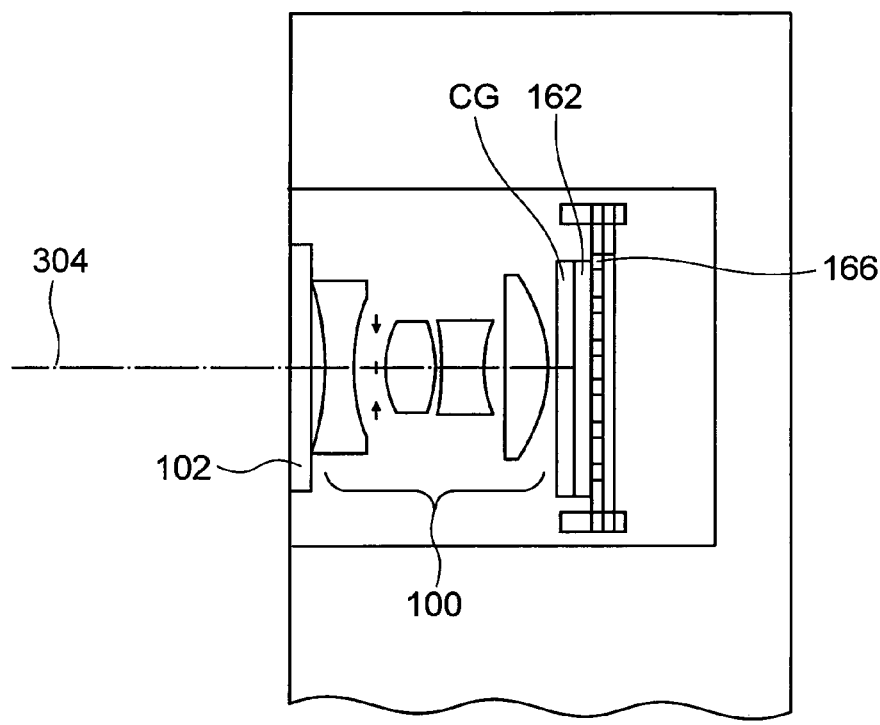
FIG. 17 is a cross-sectional view of a photographic optical system 303 of the personal computer 300.
Figure 18:
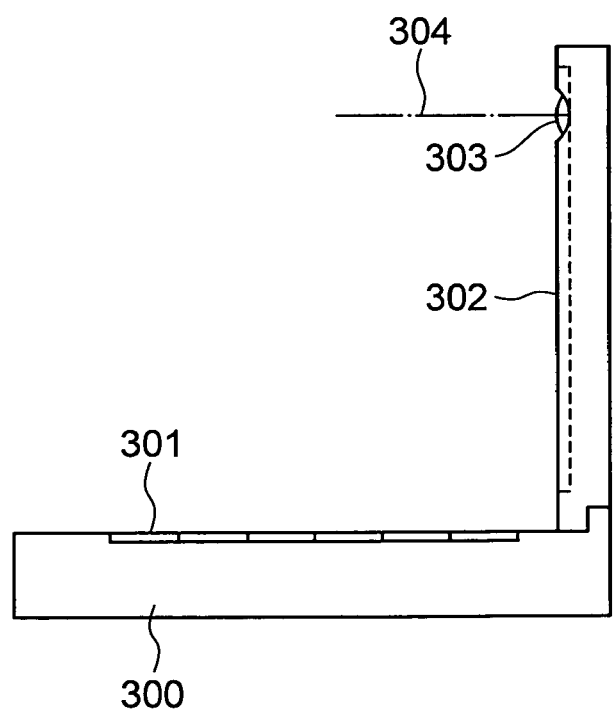
FIG. 18 is a side view of the personal computer 300.

Next, a personal computer which is an example of an information processing apparatus with a built-in image forming system as an objective optical system is shown in FIG. 16 to FIG. 18. FIG. 16 is a frontward perspective view of a personal computer 300 with its cover opened, FIG. 17 is a cross-sectional view of a photographic optical system 303 of the personal computer 300, and FIG. 18 is a side view of FIG. 16. As it is shown in FIG. 16 to FIG. 18, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 16, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 19A:
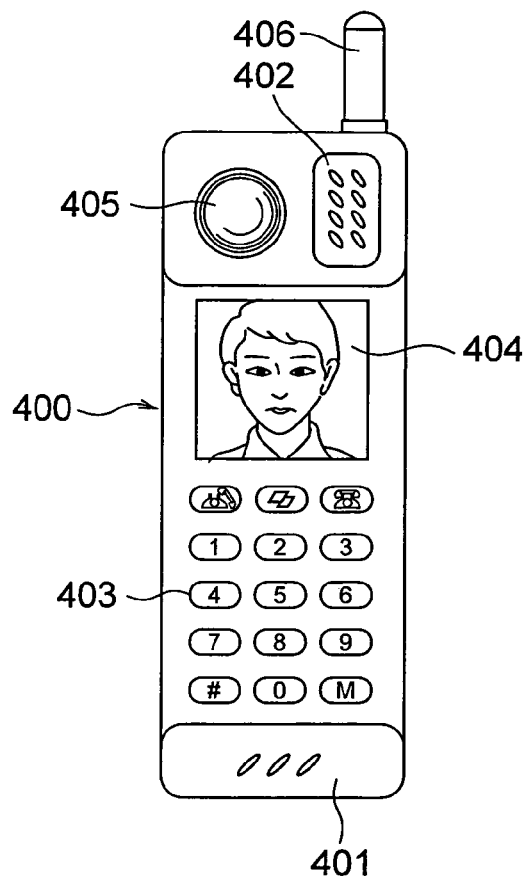
FIG. 19A, FIG. 19B, and FIG. 19C are diagrams showing a mobile telephone which is an example of the information processing apparatus in which, the zooming optical system of the present invention is built-in as a photographic optical system, where.
Figure 19B:
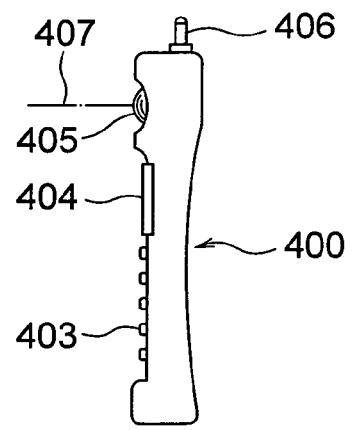
Figure 19C:
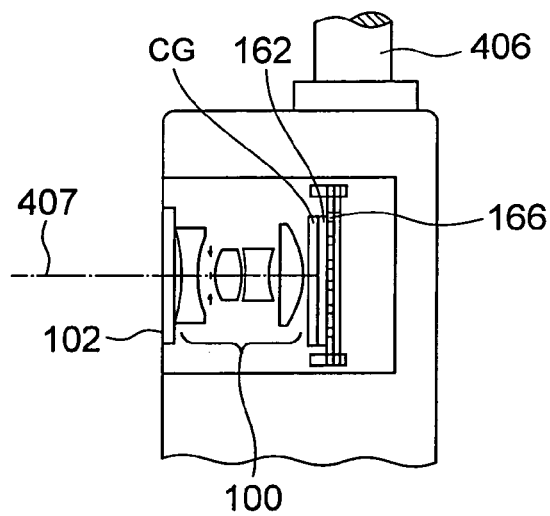

Next, a telephone which is an example of an information processing apparatus in which the image forming optical system of the present invention is built-in as a photographic optical system, particularly a portable telephone which is easy to carry is shown in FIG. 19A, FIG. 19B, and FIG. 19C. FIG. 19A is a front view of a portable telephone 400, FIG. 19B is a side view of the portable telephone 400, and FIG. 19C is a cross-sectional view of a photographic optical system 405. As shown in FIG. 19A to FIG. 19C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

The image forming optical system according to the present invention shows an effect that it is possible to realize shortening of the overall length and slimming of the image forming optical system while maintaining favorably various aberrations such as a curvature of field and the chromatic aberration. Particularly, it is possible to let to be an image forming optical system which is suitable for an image pickup element which is subjected to down-sizing while maintaining a large number of pixels.

What is claimed is:

1. A zoom lens system comprising in order from an object side:
   a first lens group having a negative refracting power;
   a second lens group having a positive refracting power;
   a third lens group having a positive refracting power, and
   a fourth lens group,
wherein:
   the first lens group includes one cemented lens component, and
   the third lens group includes one lens component, and is movable for focusing, and
   the fourth lens group includes one lens component having an aspheric surface, and
   at the time of zooming from a wide angle end to a telephoto end, the second lens group moves while following a trajectory of movement only toward the object side, and
   the first lens group and the third lens group move while following a trajectory of movement different from the trajectory of movement of the second lens group, and
   the zoom lens system satisfies the following conditional expression (1)

$$-1.5 < fw/f4 < 0.3 \quad (1)$$

where,
   f4 denotes a focal length of the fourth lens group,
   fw denotes a focal length of the overall zoom lens system at the wide angle end when focused to a predetermined object point, and
   the predetermined object point is the farthest object point which can be focused, and
the zoom lens system satisfies the following conditional expression (2)

$$1.0 < \beta 4w < 2.0 \quad (2)$$

where,
   β4w denotes a magnification of the fourth lens group at the wide angle end when focused at a predetermined object point, and the predetermined object point is the farthest object point which can be focused.

2. The zoom lens system according to claim 1, wherein the fourth lens group includes a single lens having a negative refracting power, and
a surface nearest to the object side of the single lens is a concave surface and an aspheric surface, and
the zoom lens system satisfies the following conditional expressions (3) and (4)

$$1.35 < n4 < 1.65 \quad (3)$$

$$30 < v4 < 100 \quad (4)$$

where,
n4 denotes a refractive index for a d-line of a medium which forms the single lens in the fourth lens group, and
v denotes Abbe's number for the medium which forms the single lens in the fourth lens group.

3. The zoom lens system according to claim 1, wherein the zoom lens system satisfies the following conditional expression (10)

$$-0.6 < (r11 + r13)/(r11 - r13) < 5 \quad (10)$$

where,
r11 denotes a radius of curvature near an optical axis of a surface nearest to the object side, of the first lens group,
r13 denotes a radius of curvature near an optical axis, of a surface nearest to an image side, of the first lens group.

4. The zoom lens system according to claim 1, wherein the zoom lens system satisfies the following conditional expression (13)

$$-0.55 < \beta 234w < -0.25 \quad (13)$$

where,
β234w denotes a combined zooming ratio of the second lens group, the third lens group, and the fourth lens group at the wide angle end when focused on a predetermined object point.

5. The zoom lens system according to claim 1, wherein the zoom lens system satisfies the following conditional expressions (14) and (15)

$$1.0 < f2/fw < 2.0 \quad (14)$$

$$-0.05 < (Dw - Dt)/(Dw + Dt) < 0.05 \quad (15)$$

where,
f2 denotes a combined focal length of the second lens group,
Dw denotes an overall optical length (a distance from an apex of a surface nearest to the object side up to an image forming surface) at the wide angle end when focused to the predetermined object point, and
Dt denotes an overall optical length (a distance from an apex of a surface nearest to the object side up to an image forming surface) at the telephoto end when focused to the predetermined object point.

6. The zoom lens system according to claim 1, wherein the zoom lens system satisfies the following conditional expression (19)

$$1.0 < \beta 34t/\beta 34w < 1.7 \quad (19)$$

where,
β34w denotes a combined zooming ratio of the third lens group and the fourth lens group at the wide angle end, when focused on the predetermined object point, and
β34t denotes a combined zooming ratio of the third lens group and the fourth lens group at the telephoto end, when focused on the predetermined object point.

7. The zoom lens system according to claim 1, wherein the zoom lens system satisfies the following conditional expressions (20) and (21)

$$0 < fw/f34w < 0.6 \quad (20)$$

$$0.2 < -f4/f3 < 6 \quad (21)$$

where,
f34 denotes a combined focal length of the third lens group and the fourth lens group at the wide angle end, when focused on the predetermined object point,
f3 denotes a focal length of the third lens group, and
f4 denotes a focal length of the fourth lens group.

8. The zoom lens system according to claim 1, wherein the third lens group includes only a single lens.

9. The zoom lens system according to claim 1, wherein the zoom lens system satisfies the following conditional expression (22)

$$0.3 < r31/r25 < 3 \quad (22)$$

where,
r25 denotes a radius of curvature of a surface nearest to the image side, of the second lens group, and
r31 denotes a radius of curvature of a surface nearest to the object side, of the third lens group, and each of r25 and r31 is a radius of curvature near an optical axis.

10. The zoom lens system according to claim 1, wherein the zoom lens system satisfies the following conditional expression (23)

$$0.4 < r32/r41 < 1.4 \quad (23)$$

where,
r32 denotes a radius of curvature of a surface nearest to the image side, of the third lens group, and
r41 denotes a radius of curvature of a surface nearest to the object side, of the fourth lens group, and each of r32 and r41 is a radius of curvature near an optical axis.

11. The zoom lens system according to claim 1, wherein an apex surface nearest to the object side of the third lens group is positioned all the time on the image side of an apex surface position nearest to the image side of the second lens group at the wide angle end.

12. An electronic image pickup apparatus comprising:
a zoom lens system according to claim 1;
an electronic image pickup element; and
an image processing mechanism which processes image data obtained by picking up an image formed through the zoom lens system, by the electronic image pickup element, and outputs as image data in which, a shape of an image is changed, wherein
the zoom lens system satisfies the following conditional expression (24) when focused on a predetermined object point $$0.7 < y_{07}/(fw \cdot \tan \omega_{07w}) < 0.97 \quad (24)$$

where,
$y_{07}$ is expressed as $y_{07}=0.7 \cdot y_{10}$, when a distance (the maximum image height) from a center up to the farthest point on an effective image pickup surface (on a surface on which an image can be picked up) of the electronic image pickup element is let to be $y_{10}$,
$\omega_{07w}$ is an angle with respect to an optical axis in an object-point direction corresponding to an image point from a center on the image pickup surface up to a position of $y_{07}$, at a wide angle end, and
fw is a focal length of the overall zoom lens system at the wide angle end when focused on a predetermined object point.

13. The zoom lens system according to claim 1, wherein the second lens group includes in order from the object side, a lens component of a meniscus shape having a concave surface directed toward the image side, and a lens component of a biconvex shape.

14. The zoom lens system according to claim 13, wherein the zoom lens system satisfies the following conditional expression (16)

$$0.5 < r23/r21 < 1.5 \quad (16)$$

where,
r21 denotes a radius of curvature of a surface nearest to the object side of a lens component on the object side in the second lens group, and
r23 denotes a radius of curvature of a surface nearest to the image side of the lens component on the object side in the second lens group, and both r23 and r21 are radii of curvature near the optical axis.

15. The zoom lens system according to claim 1, wherein the second lens group includes in order from the object side, a lens component having a positive lens and a negative lens cemented, and a positive single lens.

16. The zoom lens system according to claim 15, wherein the zoom lens system satisfies the following conditional expressions (17) and (18)

$$0.0 < (r21+r23)/r22 < 1.3 \quad (17)$$

$$-1.0 < (r24+r25)/(r24-r25) < 1.0 \quad (18)$$

where,
r22 denotes a radius of curvature of a cemented surface of a lens component on the object side, in the second lens group,
r24 denotes a radius of curvature of a surface nearest to the object side of a lens component on the image side, in the second lens group, and
r25 denotes a radius of curvature of a surface nearest to the image side of the lens component on the image side, in the second lens group, and each of r22, r24, and r25 is a radius of curvature near an optical axis.

17. The zoom lens system according to claim 1, wherein the cemented lens component in the first lens group includes a negative lens $L_{1N}$ and a positive lens $L_{1P}$, and the negative lens $L_{1N}$ and the positive lens $L_{1P}$ are cemented in this order from the object side.

18. The zoom lens system according to claim 17, wherein a cemented surface $S_C$ of the negative lens $L_{1N}$ and the positive lens $L_{1P}$ in the first lens group is an aspheric surface.

19. The zoom lens system according to claim 17, wherein when coordinate axes are let to be such that, an optical axial direction is z, and a direction perpendicular to the optical axis is h, R is let to be a radius of curvature on an optical axis of a spherical surface component, k is let to be a conical constant, and $A_4, A_6, A_8, A_{10}, \ldots$ are let to be aspherical coefficients, and when a shape of the aspheric surface is expressed by the following expression (5)

$$z = h^2/R/[1+\{1-(1+k)h^2/R^2\}^{1/2}] + A_4h^4 + A_6h^6 + A_8h^8 + A_{10}h^{10} + \ldots \quad (5)$$

the zoom lens system satisfies the following conditional expression (6)

$$0.05 \leq |z_C(h_C) - z_B(h_B)|/tp \leq 0.96 \quad (6)$$

where,
$z_B(h)$ is a shape of a surface $S_B$ in contact with air of the positive lens $L_{1P}$, which is according to expression (5),
$z_C(h)$ is a shape of a contact surface $S_C$, which is according to expression (5),
tp is an optical axial thickness of the positive lens $L_{1P}$,
$h_B = 2.5a$, and $h_C = 2.5a$,
where,
a is a quantity according to the following conditional expression (7), $$a = (y_{10})^2 \cdot \log_{10} \gamma / fw \quad (7)$$

and moreover in expression (7),
$y_{10}$ is the maximum image height,
γ is a zooming ratio when focused at the predetermined object point, and
moreover, for letting an apex of each surface to be an origin point, z(0)=0 all the time.

20. The zoom lens system according to claim 17, wherein when coordinate axes are let to be such that, an optical axial direction is z, and a direction perpendicular to the optical axis is h, R is let to be a radius of curvature on an optical axis of a spherical surface component, k is let to be a conical constant, and $A_4, A_6, A_8, A_{10}, \ldots$ are let to be aspherical coefficients, and when a shape of the aspheric surface is expressed by the following expression (5)

$$z = h^2/R/[1+\{1-(1+k)h^2/R^2\}^{1/2}] + A_4h^4 + A_6h^6 + A_8h^8 + A_{10}h^{10} + \ldots \quad (5)$$

when an amount of deviation is expressed by the following expression (8)

$$\Delta z = z - h^2/R/[1+\{1-h^2/R^2\}^{1/2}] \quad (8),$$

the zoom lens system satisfies the following conditional expression (9)

$$-0.070 \leq [\Delta z_C(h_C) - \{\Delta z_A(h_A) + \Delta z_B(h_B)\}/2]/fw \leq 0.100 \quad (9)$$

where,
$z_A(h)$ is a shape of a surface $S_A$ in contact with air of the negative lens $L_{1N}$, which is according to expression (5),
$z_B(h)$ is a shape of a surface $S_B$ in contact with air of the positive lens $L_{1P}$, which is according to expression (5),
$z_C(h)$ is a shape of a contact surface $S_C$, which is according to expression (5),
$\Delta z_A(h)$ is an amount of deviation on (in) the surface $S_A$ in contact with air of the negative lens $L_{1N}$, which is an amount according to conditional expression (8),
$\Delta z_B(h)$ is an amount of deviation on (in) the surface SB in contact with air of the positive lens $L_{1P}$, which is an amount according to conditional expression (8),
$z_C(h)$ is an amount of deviation on (in) the contact surface $S_C$, which is an amount according to conditional expression (8), and
$h_A = 3.0a$, $h_B = 2.5a$, and $h_C = 2.5a$,
where,
a is a quantity according to the following conditional expression (7), $$a = (y_{10})^2 \cdot \log_{10} \gamma / fw \quad (7)$$

and moreover in conditional expression (7),
$y_{10}$ is the maximum image height,
γ is a zooming ratio when focused at the predetermined object point, and
moreover, for letting an apex of each surface to be an origin point, z(0)=0 all the time.

21. The zoom lens system according to claim 17, wherein the zoom lens system satisfies the following conditional expression (11)

$$|(\theta gFp - \theta gFn)/(\nu dp - \nu dn)| < 0.0045 \quad (11)$$

where, $\theta gFp$ denotes a partial dispersion ratio $(ng_{1P}-nF_{1P})/(nF_{1P}-nC_{1P})$ of the positive lens $L_{1P}$, $\theta gFn$ denotes a partial dispersion ratio $(ng_{1N}-nF_{1N})/(nF_{1N}-nC_{1N})$ of the negative lens $L_{1N}$, $vdp$ denotes Abbe's number $(nd_{1P}-1)/(nF_{1P}-nC_{1P})$, $vdn$ denotes Abbe's number $(nd_{1N}-1)/(nF_{1N}-nC_{1N})$, where, $nd_{1P}$, $nC_{1P}$, $nF_{1P}$, and $ng_{1P}$ denote refractive indices for d-line, C-line, F-line, and g-line respectively, of the positive lens $L_{1P}$, and $nd_{1N}$, $nC_{1N}$, $nF_{1N}$, and $ng_{1N}$ denote refractive indices for d-line, C-line, F-line, and g-line respectively, of the negative lens $L_{1N}$.

22. The zoom lens system according to claim 21, wherein the zoom lens system satisfies the following conditional expression (12)

$$|(\theta hgp - \theta hgn)/(vdp - vdn)| < 0.0060 \quad (12)$$

where, $\theta hgp$ denotes a partial dispersion ratio $(nh_{1P}-ng_{1P})/(nF_{1P}-nC_{1P})$ of the positive lens $L_{1P}$, $\theta hgn$ denotes a partial dispersion ratio $(nh_{1N}-ng_{1N})/(nF_{1N}-nC_{1N})$ of the negative lens $L_{1N}$, $nh_{1P}$ denotes a refractive index for h-line of the positive lens $L_{1P}$, $nh_{1N}$ denotes a refractive index for h-line of the negative lens $L_{1N}$.

\* \* \* \* \*